(12) United States Patent
Schnabel et al.

(10) Patent No.: US 12,460,213 B2
(45) Date of Patent: Nov. 4, 2025

(54) INDUCIBLE AMMONIA PRODUCTION FROM A SYMBIOTIC DIAZOTROPH, METHODS OF CREATION AND USES THEREOF

(71) Applicant: The Board of Trustees of the Leland Stanford Junior University, Stanford, CA (US)

(72) Inventors: Tim Schnabel, Stanford, CA (US); Elizabeth Sattely, Stanford, CA (US)

(73) Assignee: The Board of Trustees of the Leland Stanford Junior University Stanford, CA, Stanford, CA (US)

( * ) Notice: Subject to any disclaimer, the term of this patent is extended or adjusted under 35 U.S.C. 154(b) by 967 days.

(21) Appl. No.: 17/428,927

(22) PCT Filed: Feb. 5, 2020

(86) PCT No.: PCT/US2020/016856
§ 371 (c)(1),
(2) Date: Aug. 5, 2021

(87) PCT Pub. No.: WO2020/163509
PCT Pub. Date: Aug. 13, 2020

(65) Prior Publication Data
US 2022/0127624 A1 Apr. 28, 2022

Related U.S. Application Data

(60) Provisional application No. 62/801,454, filed on Feb. 5, 2019.

(51) Int. Cl.
*C12N 9/00* (2006.01)
*A01N 63/20* (2020.01)
*C12N 9/12* (2006.01)
*C12N 15/63* (2006.01)
*C12N 15/74* (2006.01)
*C12P 3/00* (2006.01)

(52) U.S. Cl.
CPC ........... *C12N 15/635* (2013.01); *A01N 63/20* (2020.01); *C12N 9/1241* (2013.01); *C12N 15/74* (2013.01); *C12P 3/00* (2013.01); *C12Y 207/07051* (2013.01)

(58) Field of Classification Search
CPC .. C12N 9/1018; C12N 9/1229; C12N 9/0044; C12Y 118/06001; C12Y 305/01002; C12Y 207/07059; C05C 11/00
USPC ........................................................ 435/69.1
See application file for complete search history.

(56) References Cited

U.S. PATENT DOCUMENTS

2002/0022718 A1   2/2002  Forsyth et al.
2007/0292898 A1  12/2007  Buist

2018/0002243 A1   1/2018  Temme et al.
2018/0273437 A1   9/2018  Temme et al.
2018/0297905 A1  10/2018  Temme et al.
2018/0297906 A1  10/2018  Temme et al.

FOREIGN PATENT DOCUMENTS

| AU | 2016294506 A1 | 1/2018 |
| CA | 2991776 A1 | 1/2017 |
| CN | 108602729 A | 9/2018 |
| EP | 3322679 A1 | 5/2018 |
| IN | 201817001025 A | 3/2018 |
| KR | 20180052605 A | 5/2018 |
| WO | 2017011602 A1 | 1/2017 |
| WO | 2018132774 A1 | 7/2018 |
| WO | 2020163509 A1 | 8/2020 |

OTHER PUBLICATIONS

Devos et al., (Proteins: Structure, Function and Genetics, 2000, vol. 41: 98-107.*
Whisstock et al., (Quarterly Reviews of Biophysics 2003, vol. 36 (3): 307-340.*
Witkowski et al., (Biochemistry 38:11643-11650, 1999.*
Kisselev L., (Structure, 2002, vol. 10: 8-9.*
International Preliminary Report on Patentability for International Application PCT/US2020/016856, Report issued Aug. 10, 2021, Mailed Aug. 19, 2021, 7 pgs.
International Search Report and Written Opinion for International Application No. PCT/US2020/016856, Search completed May 6, 2020, Mailed Jul. 20, 2020, 15 pgs.
Ambrosio et al., "Metabolic engineering of a diazotrophic bacterium improves ammonium release and biofertilization of plants and microalgae", Metabolic Engineering, vol. 40, Mar. 2017, pp. 59-68, doi: 10.1016/j.ymben.2017.01.002.
Awika, "Advances in Cereal Science: Implications to Food Processing and Health Promotion", American Chemical Society, vol. 1089, Chapter 1, Nov. 30, 2011, pp. 1-13, doi: 10.1021/bk-2011-1089.ch001.
Baldani et al., "Inoculation of rice plants with the endophytic diazotrophs Herbaspirillum seropedicae and *Burkholderia* spp.", Biology and Fertility of Soils, vol. 30, No. 5, Jan. 2000, pp. 485-491, doi: 10.1007/s003740050027.

(Continued)

*Primary Examiner* — Tekchand Saidha
*Assistant Examiner* — Mohammad Y Meah
(74) *Attorney, Agent, or Firm* — KPPB LLP

(57) ABSTRACT

The present disclosure describes systems and methods capable of fixing atmospheric nitrogen into bio-available nitrogenous compounds, including ammonia. Embodiments of the present disclosure are directed to synthetic DNA constructs encoding genes to allow release of bio-available nitrogenous compounds in nitrogen fixing diazotrophic organisms. Many of these constructs encode these genes in inducible and constitutive means, such that inducible embodiments can be activated at select times. Additional embodiments are directed to genetically engineered diazotrophs utilizing these constructs to produce bio-available nitrogenous compounds. Further embodiments are directed to methods to create these constructs and organisms as well as to use these constructs and organisms.

14 Claims, 11 Drawing Sheets
Specification includes a Sequence Listing.

(56) References Cited

OTHER PUBLICATIONS

Boddey et al., "Endophytic nitrogen fixation in sugarcane: present knowledge and future applications", Plant and Soil, vol. 252, May 2003, pp. 139-149, doi: 10.1023/A:1024152126541.

Bolleter et al., "Spectrophotometric Determination of Ammonia as Indophenol", Analytical Chemistry, vol. 33, No. 4, Apr. 1, 1961, pp. 592-594, doi: 10.1021/ac60172a034.

Christiansen-Weniger et al., "Nitrogen fixation by Azospirillum brasilense in soil and the rhizosphere under controlled environmental conditions", Biology and Fertility of Soils, vol. 12, No. 2, Oct. 1991, pp. 100-106, doi: 10.1007/bf00341483.

Clancy et al., "The domains carrying the opposing activities in adenylyltransferase are separated by a central regulatory domain", The FEBS Journal, vol. 274, No. 11, May 4, 2007, pp. 2865-2877, doi: 10.1111/j. 1742-4658.2007.05820.x.

Curatti et al., "Challenges to develop nitrogen-fixing cereals by direct nif-gene transfer", Plant Science, vol. 225, Aug. 2014, pp. 130-137, doi: 10.1016/j.plantsci.2014.06.003.

Dixon et al., "Genetic regulation of biological nitrogen fixation", Nature Reviews Microbiology, vol. 2, No. 8, Aug. 1, 2004, pp. 621-631, doi: 101.1038/nrmicro954.

Dos Santos et al., "Distribution of nitrogen fixation and nitrogenase-like sequences amongst microbial genomes", BMC Genomics, vol. 13, No. 162, May 3, 2012, pp. 1-12, doi: 10.1186/1471-2164-13-162.

Goldberg et al., "Relation Between the Adenylylation State of Glutamine Synthetase and the Expression of Other Genes Involved in Nitrogen Metabolism", Journal of Bacteriology, vol. 137, No. 3, Mar. 1, 1979, pp. 1282-1289, doi: 10.1128/jb.137.3.1282-1289. 1979.

Jaggi et al., "The two opposing activities of adenylyl transferase reside in distinct homologous domains, with intramolecular signal transduction", The EMBO Journal, vol. 16, No. 18, Sep. 15, 1997, pp. 5562-5571, doi: 10.1093/emboj/16.18.5562.

Jiang et al., "Structure-Function Analysis of Glutamine Synthetase Adenylyltransferase (ATase, EC 2.7.7.49) of *Escherichia coli*", Biochemistry, vol. 46, No. 13, Apr. 3, 2007, pp. 4117-4132, doi: 10.1021/bi0620508.

Kahn et al., "A mass spectrometry method for measuring 15N incorporation into pheophytin", Analytical Biochemistry, vol. 307, No. 2, Aug. 15, 2002, pp. 219-225, doi: 10.1016/s0003-2697(02)00046-5.

Long, "Genes and Signals in the Rhizobium-Legume Symbiosis", Plant Physiology, vol. 125, No. 1, Jan. 2001, pp. 69-72, doi: 10.1104/pp.125.1.69.

Merrick et al., "Nitrogen Control in Bacteria", Microbiological Review, vol. 59, No. 4, Dec. 1, 1995, pp. 604-622, doi: 10.1128/mr.59.4.604-622.1995.

Mus et al., "Symbiotic Nitrogen Fixation and the Challenges to Its Extension to Nonlegumes", Applied and Environmental Microbiology, vol. 82, No. 13, Jun. 13, 2016, pp. 3698-3710, doi: 10.1128/AEM.01055-16.

Nielander et al., "A Versatile Method for Ammonia Detection in a Range of Relevant Electrolytes via Direct Nuclear Magnetic Resonance Techniques", ACS Catalysis, vol. 9, No. 7, May 30, 2019, pp. 1-24, doi: 101.1021/acscatal.9b00358.

Ortiz-Marquez et al., "Metabolic engineering of ammonium release for nitrogen-fixing multispecies microbial cell-factories", Metabolic Engineering, vol. 23, May 2014, pp. 154-164, doi: 10.1016/j.ymben. 2014.03.002.

Pankievicz et al., "Robust biological nitrogen fixation in a model grass-bacterial association.", The Plant Journal, vol. 81, No. 6, Jan. 28, 2015, pp. 907-919, doi: 10.1111/tpj.12777.

Parra-Colmenares et al., "Determination of nitrogen fixation effectiveness in selected Medicago truncatula isolates by measuring nitrogen isotope incorporation into pheophytin", Plant and Soil, vol. 270, Mar. 2005, pp. 159-168, doi: 10.1007/s11104-004-1308-y.

Pirola et al., "Isolation and Characterization of Glutamine Synthetase from the Diazotroph Azospirillum Brasilense", International Journal of Biochemistry, vol. 24, No. 11, Nov. 1992, pp. 1749-1754, doi: 10.1016/0020-711X(92)90124-J.

Rogers et al., "Synthetic biology approaches to engineering the nitrogen symbiosis in cereals", Journal of Experimental Botany, vol. 65, No. 8, May 2014, pp. 1939-1946, doi: 101.1093/jxb/eru098.

Rosenblueth et al., "Nitrogen Fixation in Cereals", Frontiers in Microbiology, vol. 9, No. 1794, Aug. 9, 2018. pp. 1-13, doi: 10.3389/fmicb.2018.01794.

Santos et al., "Wheat colonization by an Azospirillum brasilense ammonium-excreting strain reveals upregulation of nitrogenase and superior plant growth promotion", Plant and Soil, vol. 415, Dec. 28, 2016, pp. 245-255, doi: 10.1007/s11104-016-3140-6.

Schwab et al., "The glnAntrBC operon of Herbaspirillum seropedicae is transcribed by two oppositely regulated promoters upstream of glnA", Canadian Journal of Microbiology, vol. 53, No. 1, Jan. 2007, pp. 100-105, doi: 10.1139/w06-113.

Stadtman, "Regulation of Glutamine Synthetase Activity", EcoSal Plus, vol. 1, No. 1, Sep. 9, 2004, 12 pgs., doi: 10.1128/ecosalplus. 3.6.1.6.

Temme et al., "Refactoring the nitrogen fixation gene cluster from Klebsiella oxytoca", Proceedings of the National Academy of Sciences, vol. 109, No. 18, Apr. 16, 2012, pp. 7085-7090, doi: 10.1073/pnas. 1120788109.

Wu et al., "Alpha-Ketoglutarate: Physiological Functions and Applications", Biomolecules & Therapeutics, vol. 24, No. 1, Jan. 1, 2016, pp. 1-8, doi: 10.4062/biomolther.2015.078.

Wurtzel et al., "Revolutionizing agriculture with synthetic biology", Nature Plants, vol. 5, No. 12, Nov. 18, 2019, pp. 1207-1210, doi: 10.1038/s41477-019-0539-0.

Zamaroczy et al., "Functional Organization of the glnB-glnA Cluster of Azospirillum brasilense", Journal of Bacteriology, vol. 175, No. 9, May 1, 1993, pp. 2507-2515, doi: 10.1128/jb.175.9.2507-2515.1993.

\* cited by examiner

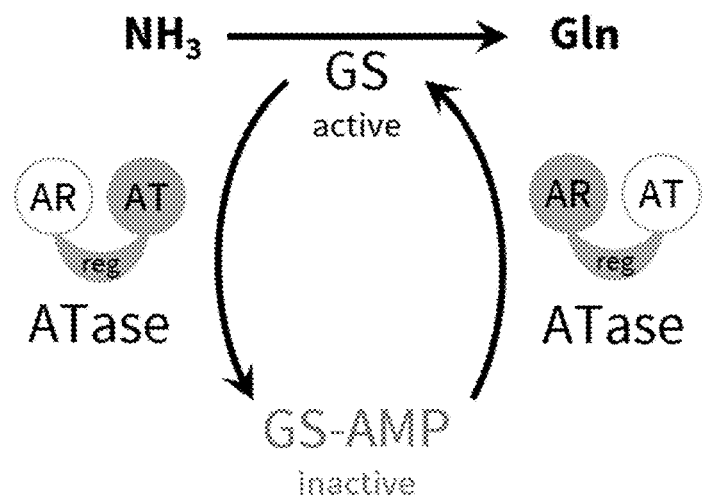
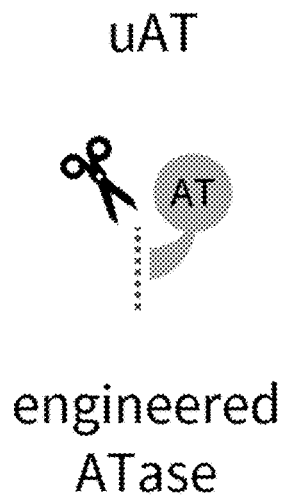
FIG. 1A
FIG. 1B
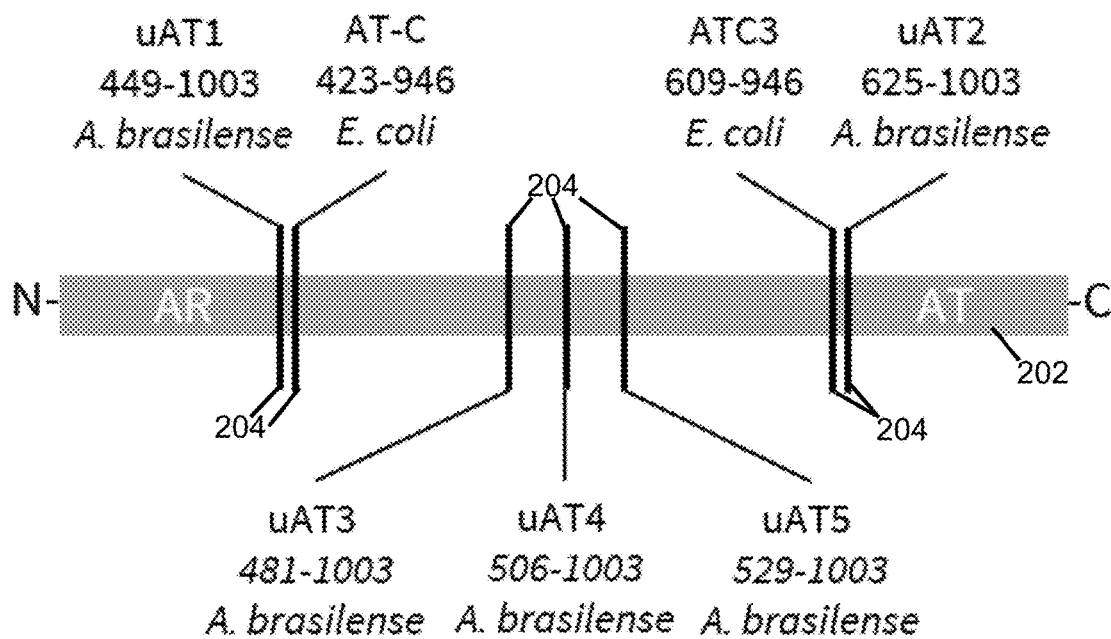
FIG. 2

INDUCIBLE AMMONIA PRODUCTION FROM A SYMBIOTIC DIAZOTROPH, METHODS OF CREATION AND USES THEREOF

CROSS-REFERENCE TO RELATED APPLICATIONS

This application is a national stage of PCT Patent Application No. PCT/US2020/016856, entitled "Inducible Ammonia Production from a Symbiotic Diazotroph, Methods of Creation and Uses Thereof" to Schnabel et al., filed Feb. 5, 2020, which claims priority to U.S. Provisional Application Ser. No. 62/801,454, entitled "Inducible Ammonia Excretion from a Diazotroph, Methods of Creation and Uses Thereof" to Schnabel et al., filed Feb. 5, 2019, which are herein incorporated by reference in their entireties.

SEQUENCE LISTING

This application hereby incorporates by reference the material of the electronic Sequence Listing filed concurrently herewith. The material in the electronic Sequence Listing is submitted as a text (.txt) file entitled "05977PCT-SeqList_ST25.txt" created on Jan. 29, 2020, which has a file size of 18 KB, and is herein incorporated by reference in its entirety.

FIELD OF THE INVENTION

The present invention relates generally to in vivo nitrogen fixation in genetically modified organisms, including methods to create nitrogen fixing organisms and uses thereof, more particularly, bacteria genetically engineered to release nitrogenous compounds that are available for biological use. The present invention is also directed to formulations and methods of using genetically engineered nitrogen fixing organisms.

BACKGROUND OF THE INVENTION

Nitrogen is the major limiting nutrient on industrially farmed land. While the atmosphere is comprised of approximately 78% nitrogen ($N_2$), a strong triple bond between the nitrogen atoms makes $N_2$ inert and inaccessible to some species. Current methods of agriculture have depleted organic soil nitrogen faster than it can be replenished naturally. (See e.g., Developments in Soil Science, Vol. 3. (ed. F. E. Allison) 120-138 (Elsevier, 1973); the disclosure of which is incorporated herein in its entirety.) Converting nitrogen from $N_2$ to a bio-available form such as ammonia ($NH_3$) is called nitrogen fixation. As fields are depleted of organic nitrogen reserves, over 100 million tons per year of synthetically fixed nitrogen fertilizer currently support crops feeding approximately 3 billion people. (See e.g., Davidson, E. A. et al. Excess nitrogen in the US Environment: trends, risks and solutions. ESA Issue Ecol 15 (2012); and Galloway, J. N. et al. Transformation of the Nitrogen Cycle: Recent Trends, Questions, and Potential Solutions. Science 320, 889 (2008); the disclosures of which are incorporated herein in their entireties.) Furthermore, the Haber-Bosch process, which currently fixes the vast majority of nitrogen used for fertilizer, is unsustainable because it is energy intensive, produces potent greenhouse gasses, and generates fertilizer for bulk application, which leads to inefficient plant uptake, microbial scavenging, $N_xO_x$ pollution, leaching and eutrophication, and water poisoning. Additionally, nitrogen fixation through the Haber-Bosch process is highly centralized and does not reach many parts of the world where farmers are dependent on poor quality soils.

A highly sought-after solution is the biological provision of fixed nitrogen directly at the root of plants. (See e.g., Pankievicz, V. C. S., et al. Are we there yet? The long walk towards the development of efficient symbiotic associations between nitrogen-fixing bacteria and non-leguminous crops. BMC Biology 17, 99 (2019); Mus, F. et al. Symbiotic Nitrogen Fixation and Challenges to Extending it to Non-Legumes. Applied and Environmental Microbiology (2016); and Wurtzel, E. T. et al. Revolutionizing agriculture with synthetic biology. Nature Plants 5, 1207-1210 (2019); the disclosures of which are incorporated herein in their entireties.) Across several phyla, about 15% of prokaryotes have evolved diazotrophy: the capability to convert nitrogen gas ($N_2$) to bioavailable ammonia through an enzymatic nitrogen fixation process. (See e.g., Dos Santos, P. C., et al. Distribution of nitrogen fixation and nitrogenase-like sequences amongst microbial genomes. BMC Genomics 13, 162 (2012); the disclosure of which is incorporated herein in its entirety. Table 2 is a known diazotrophs, which is derived from Table S1 of Dos Santos, et al.) Some plants have evolved intimate symbioses with a subset of these diazotrophs to obtain bioavailable nitrogen, primarily limited to nodulating species of the Fabaceae family of plants and diazotrophic *Rhizobia*. (See e.g., Long, S. R. Genes and Signals in the *Rhizobium*-Legume Symbiosis. Plant Physiology 125, 69 (2001); the disclosure of which is incorporated herein in its entirety.) However, these plants do not include most domesticated crops: 50% of the world's calories come from the cereal grasses, including corn, rice, and the grains, that are not known to participate in tight nitrogen transfer symbioses. (See e.g., Mus, F. et al. Symbiotic Nitrogen Fixation and Challenges to Extending it to Non-Legumes. Applied and Environmental Microbiology (2016); Awika, J. M. in Advances in Cereal Science: Implications to Food Processing and Health Promotion, Vol. 1089 1-13 (American Chemical Society, 2011); and Rogers, C. & Oldroyd, G. E. D. Synthetic biology approaches to engineering the nitrogen symbiosis in cereals. J Exp Bot 65 (2014); the disclosures of which are incorporated herein in their entireties.) Outside the *Rhizobia*, many bacterial diazotrophs colonize plant roots through looser association in the rhizosphere or endophytic compartments. Associative diazotrophs from several genera, including *Azospirillum, Herbaspirillum, Gluconacetobacter*, and *Burkholderia* have been shown to promote plant growth and contribute to plant nitrogen supply, however, there is still a big gap between what plants require and what they currently obtain. (See e.g., Rosenblueth, M. et al. Nitrogen Fixation in Cereals. Frontiers in Microbiology 9, 1794 (2018); Pankievicz, V. C. S. et al. Robust biological nitrogen fixation in a model grass-bacterial association. The Plant Journal 81, 907-919 (2015); Santos, K. F. D. N. et al. Wheat colonization by an *Azospirillum brasilense* ammonium-excreting strain reveals upregulation of nitrogenase and superior plant growth promotion. Plant and Soil 415, 245-255 (2017); Christiansen-Weniger, C. & van Veen, J. A. Nitrogen fixation by *Azospirillum brasilense* in soil and the rhizosphere under controlled environmental conditions. Biology and Fertility of Soils 12, 100-106 (1991); Boddey, R. M., et al. Endophytic nitrogen fixation in sugarcane: present knowledge and future applications. Plant and Soil 252, 139-149 (2003); and Divan Baldani, V. L., et al. Inoculation of rice plants with the endophytic diazotrophs *Herbaspirillum seropedicae* and

*Burkholderia* spp. Biology and Fertility of Soils 30, 485-491 (2000); the disclosures of which are incorporated herein in their entireties.)

Prior engineering efforts have focused on associative diazotrophs to address the shortcoming in biological nitrogen provision for non-nodulating crops. One target has been the nitrogen fixation step directly, while a second target has been the nitrogen assimilation pathway, centered around glutamine synthetase (GS, gene abbreviation: glnA).

The former strategy involves the heterohexamer nitrogenase NifHDK complex and its many constituents that are required for its activation and efficient reduction of nitrogen to ammonia. Optimizing the NifHDK machinery for higher nitrogen fixation rates, for fixed nitrogen release, or for nitrogen fixation in heterologous organisms including plants, remains a challenge due to complex multilayered regulation at the transcriptional, translational and posttranslational levels. (See e.g., Temme, K., et al. Refactoring the nitrogen fixation gene cluster from Klebsiella oxytoca. Proc Natl Acad Sci USA 109, 7085-7090 (2012); Dixon, R. & Kahn, D. Genetic regulation of biological nitrogen fixation. Nature Reviews Microbiology 2, 621-631 (2004); and Curatti, L. & Rubio, L. M. Challenges to develop nitrogen-fixing cereals by direct nif-gene transfer. Plant Science 225, 130-137 (2014); the disclosures of which are incorporated herein in their entireties.)

Regarding the second strategy—the nitrogen assimilation pathway: Prior methods have focused on deregulating GS via active site mutation and/or inclusion of inducible promoters without direct interference in the complex regulatory network surrounding NifHDK. (See e.g., Ortiz-Marquez, J. C., et al. Metabolic engineering of ammonium release for nitrogen-fixing multispecies microbial cell-factories. Metab Eng 23, 154-164 (2014); Ambrosio, R., et al. Metabolic engineering of a diazotrophic bacterium improves ammonium release and biofertilization of plants and microalgae. Metabolic Engineering 40, 59-68 (2017); Wu, N. et al. Alpha-Ketoglutarate: Physiological Functions and Applications. Biomolecules & therapeutics 24, 1-8 (2016); and Jiang, P., et al. Structure-function analysis of glutamine synthetase adenylyltransferase (ATase, EC 2.7.7.49) of Escherichia coli. Biochemistry 46, 4117-4132 (2007); the disclosures of which are incorporated herein in their entireties.) However, these methods risk additional consequences, as GS is polycistronic and transcriptionally co-regulated with other critical regulatory genes, such as glnB in *Azospirillum brasilense* and *Gluconacetobacter diazotrophicus*, and ntrB and ntrC in *Herbaspirillum seropedicae*. (See e.g., de Zamaroczy, M., et al. Functional organization of the glnB-glnA cluster of *Azospirillum brasilense*. Journal of Bacteriology 175, 2507-2515 (1993); and Schwab, S. et al. The glnAntrBC operon of *Herbaspirillum seropedicae* is transcribed by two oppositely regulated promoters upstream of glnA. Canadian Journal of Microbiology 53, 100-105 (2007); the disclosures of which are incorporated herein in their entireties.)

SUMMARY OF THE INVENTION

Systems and methods for engineering diazotrophs to release nitrogen containing compounds in accordance with embodiments of the invention are disclosed.

In one embodiment, an inducible genetic circuit to deactivate glutamine synthetase in an organism includes a unidirectional adenylyl transferase capable of adenylylating glutamine synthetase and a system for inducing expression of the unidirectional adenylyl transferase enzyme.

In a further embodiment, the unidirectional adenylyl transferase is selected from the SEQ ID NOs: 1-7.

In another embodiment, the unidirectional adenylyl transferase is SEQ ID NO: 6.

In a still further embodiment, the system for inducing expression is a tetracycline inducing system.

In still another embodiment, the inducible genetic circuit further includes a second unidirectional adenylyl transferase capable of adenylylating glutamine synthetase.

In a yet further embodiment, the unidirectional adenylyl transferase and the second unidirectional adenylyl transferase are polycistronic.

In yet another embodiment, the unidirectional adenylyl transferase and the second unidirectional adenylyl transferase have separate promoters.

In a further embodiment again, an engineered diazotroph to release nitrogenous compounds into the environment includes a diazatrophic organism and a genetic circuit to allow expression of an enzyme capable of deactivating glutamine synthetase within the diazatrophic organism, wherein the genetic circuit is integrated into chromosomal DNA of the diazatrophic organism.

In another embodiment again, the genetic circuit includes a unidirectional adenylyl transferase capable of adenylylating glutamine synthetase and a system for inducing expression of the unidirectional adenylyl transferase enzyme.

In a further additional embodiment, the unidirectional adenylyl transferase is selected from the SEQ ID NOs: 1-7.

In another additional embodiment, the unidirectional adenylyl transferase is SEQ ID NO: 6.

In a still yet further embodiment, the system for inducing expression is a tetracycline inducing system.

In still yet another embodiment, the genetic circuit further includes a second unidirectional adenylyl transferase capable of adenylylating glutamine synthetase.

In a still further embodiment again, the unidirectional adenylyl transferase and the second unidirectional adenylyl transferase are polycistronic.

In still another embodiment again, the unidirectional adenylyl transferase and the second unidirectional adenylyl transferase have separate promoters.

In a still further additional embodiment, a method of increasing bio-available nitrogen in soil includes obtaining an engineered diazotrophic organism, wherein the engineered diazotrophic organism contains a genetic circuit capable of deactivating glutamine synthetase within the diazatrophic organism and introducing the engineered diazotrophic organism into an environment containing soil.

In still another additional embodiment, the diazotrophic organism comprises a genetic circuit to allow expression of an enzyme capable of deactivating glutamine synthetase within the diazatrophic organism, wherein the genetic circuit is integrated into chromosomal DNA of the diazatrophic organism.

In a yet further embodiment again, the genetic circuit includes a unidirectional adenylyl transferase capable of adenylylating glutamine synthetase and a system for inducing expression of the unidirectional adenylyl transferase enzyme.

In yet another embodiment again, the unidirectional adenylyl transferase is selected from the SEQ ID NOs: 1-7.

In a yet further additional embodiment, the unidirectional adenylyl transferase is SEQ ID NO: 6.

In yet another additional embodiment, the system for inducing expression is a tetracycline inducing system.

In a further additional embodiment again, the genetic circuit further comprises a second unidirectional adenylyl transferase capable of adenylylating glutamine synthetase.

In another additional embodiment again, the unidirectional adenylyl transferase and the second unidirectional adenylyl transferase are polycistronic.

In a still yet further embodiment again, the unidirectional adenylyl transferase and the second unidirectional adenylyl transferase have separate promoters.

In still yet another embodiment again, the method further includes applying an inducer to the soil.

In a still yet further additional embodiment, the inducer is tetracycline.

Additional embodiments and features are set forth in part in the description that follows, and in part will become apparent to those skilled in the art upon examination of the specification or may be learned by the practice of the disclosure. A further understanding of the nature and advantages of the present disclosure may be realized by reference to the remaining portions of the specification and the drawings, which forms a part of this disclosure.

BRIEF DESCRIPTION OF THE DRAWINGS

These and other features and advantages of the present invention will be better understood by reference to the following detailed description when considered in conjunction with the accompanying drawings where:

FIG. 1A illustrates a schematic of glutamine synthetase regulation in accordance with various embodiments of the invention.

FIG. 1B illustrates a schematic of engineered adenylyl transferases (ATases) in accordance with various embodiments of the invention.

FIG. 2 illustrates exemplary unidirectional ATases (uATs) in accordance with various embodiments of the invention.

DETAILED DESCRIPTION

Figure 3:
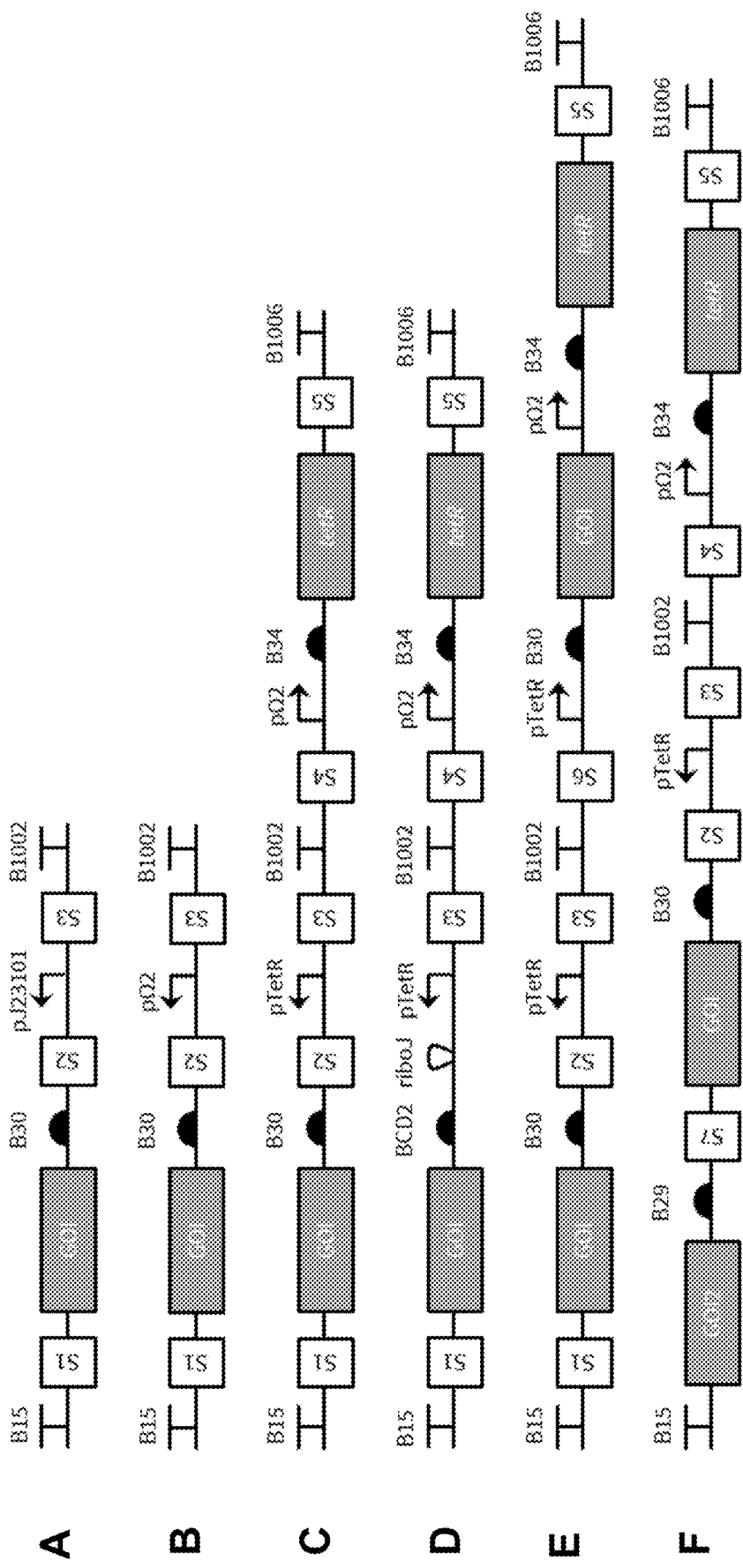
FIGS. 3A-3G illustrate exemplary genetic expression circuits in accordance with various embodiments of the invention.

The embodiments of the invention described herein are not intended to be exhaustive or to limit the invention to precise forms disclosed. Rather, the embodiments selected for description have been chosen to enable one skilled in the art to practice the invention.

Turning now to the drawings, systems, methods of making, and methods of using inducible symbiotic diazotrophs are illustrated. Many embodiments are directed to novel genes capable of post-transcriptionally regulating glutamine synthetase (GS) by adenylylating GS via a GS adenylyltransferase (ATase), including glnE. A number of embodiments create a unidirectional ATase that is capable of adenylylating GS and not capable of removing (e.g., hydrolyzing) the adenylyl group from GS. Additional embodiments incorporate novel genes into genetic circuits to constitutively or inducibly express these genes in vivo. Further embodiments are directed to diazotrophic organisms capable of producing bio-available nitrogen, including ammonia. Certain embodiments produce ammonia by regulating glutamine synthetase (GS).

Glutamine synthetase (GS) is a ubiquitous enzyme that combines ammonia and glutamate to synthesize glutamine. GS activity is required for cellular nitrogen cycling, since it is the primary route by which ammonia initially enters or re-enters the highly branched cellular metabolism of nucleic acid, amino acid, and secondary metabolite biosynthesis. (See e.g., Stadtman, E. R. Regulation of Glutamine Synthetase Activity. EcoSal Plus 1 (2004); and Merrick, M. J. & Edwards, R. A. Nitrogen control in bacteria. Microbiol Rev 59, 604-622 (1995); the disclosures of which are incorporated herein in their entireties.)

Because transcriptional regulation of GS has many consequences, non-transcriptional regulation to regulate enzyme activity may be a better target for producing ammonia by deactivating GS. ATases, including glnE, post-translationally deactivates GS through adenylylation. This process is reversible by hydrolysis of the adenylyl groups by the same enzyme. Previous work has shown that in Escherichia coli the adenylyltransferring and the adenylylremoving activities reside in separate, homologous protein domains and that these can function independently to modulate GS activity in vitro. 33, 36. (See e.g., Jiang, P., et al. Structure-function analysis of glutamine synthetase adenylyltransferase (ATase, EC 2.7.7.49) of Escherichia coli. Biochemistry 46, 4117-4132 (2007); and Jaggi, R., et al. The two opposing activities of adenylyl transferase reside in distinct homologous domains, with intramolecular signal transduction. Embo j 16, 5562-5571 (1997); the disclosures of which are incorporated herein in their entireties.)

Unidirectional ATases

Turning to FIG. 1A, a schematic of the regulation of glutamine synthetase (GS) is illustrated. In particular, active GS is responsible for catalyzing the reaction of ammonia ($NH_3$) and glutamate to glutamine (Gln). However, when GS is adenylylated (GS-AMP), activity of GS is shut off, and glutamine is not produced by a cell and/or an organism. The adenylylation of GS is performed by an adenylyl transferase (ATase). However, many ATases possess adenylyl transfer domain (AT) and adenylyl removal domain (AR), thus allowing ATases to both activate and deactivate GS. Turning to FIG. 1B, many embodiments will engineer ATases to possess only the AT domains, thus becoming a unidirectional ATase (uAT) to deactivate GS.

A number of ways exist in the art to generate unidirectional ATases capable of adenylylating GS. For example, certain embodiments will delete the native ATase gene (e.g. glnE) and then introduce uATs. Further embodiments will introduce point mutations within an ATase that disrupt activity in the AR domain. Additional embodiments will manipulate genes to produce truncated ATases that are missing some or all of the AR domain. To identify ATase genes and domains within these genes, a number of embodiments will align gene and/or protein (known or predicted) sequences to identify AT domains and ATase genes. Turning to FIG. 2, an example of a native ATase peptide 202 is illustrated along with truncation sites in accordance with certain embodiments. In particular, the ATase peptide 202 spans from the N-terminus (N) to the C-terminus (C), with the AR domain existing proximal the N-terminus, and the AT domain existing proximal to the C-terminus. Truncation sites 204 represent exemplary uATs of certain embodiments, where the mature ATase enzyme from *E. coli* or *A. brasilense* have been truncated to the amino acids noted in FIG. 2. The uATs illustrated in FIG. 2 are summarized in Table 1 along with sequence identification numbers (SEQ ID NOs) for their respective coding sequences. It should be noted that while uATs generated from *E. coli* and *A. brasilense* are provided herein, many embodiments are not limited to these species, and further embodiments will create uATs from additional species, including many diazotrophic organisms. Additional embodiments will further truncate an ATase at additional locations. Diazotrophic organisms in accordance with a number of embodiments include *Proteobacteria* (such as *Pseudomonas, Enterobacter, Stenotrophomonas, Burkholderia, Rhizobium, Herbaspirillum, Pantoea, Serratia, Rahnella, Azospirillum, Azorhizobium, Azotobacter, Duganella, Delftia, Bradyrhizobium, Sinorhizobium*, and *Halomonas*), *Firmicutes* (such as *Bacillus, Paenibacillus, Lactobacillus, Mycoplasma*, and *Acetobacterium*), and *Actinobacteria* (such as *Streptomyces, Rhodococcus, Microbacterium*, and *Curtobacterium*).

A number of embodiments will integrate uATs into a genetic circuit including promoter systems for constitutive or inducible expression. Turning to FIGS. 3A-3G, exemplary circuits are illustrated, such that a gene of interest (GOI) (e.g., uAT) is activated either constitutively or inducibly. Specifically, FIGS. 3A-3B illustrate constitutive expression circuits to cause embodiments to produce uAT without exogenous control, while FIGS. 3C-3G illustrate inducible circuits, where expression of the GOI is induced by an exogenous inducer. Certain embodiments will use a tetracycline inducing system, such that exposure to tetracycline will allow expression of the GOI (e.g., uAT). While FIGS. 3C-3G illustrate systems inducible using tetracycline, further inducible circuits can be utilized in various embodiments, including systems that induce expression using quorum sensing molecules and/or plant produced molecules. Further, certain embodiments will use a repressor, such that a GOI is repressed in the presence of a molecule, but it activates in the absence of the molecule. Further embodiments will utilize a system that allows induction and repression of a GOI at will by addition of certain molecules. Still further embodiments will utilize an oscillatory circuit to regulate GS activity, where oscillatory circuits allow for the genetic to circuit to oscillate between "on" and "off" states of expression at certain intervals, such as time or cellular reproduction. Many circuits in accordance with various embodiments further possess spacer sequences (e.g., S1-S4), enhancer sequences, and/or any additional type sequence known in the art to increase, enhance, and/or enable gene expression.

Figure 3G:
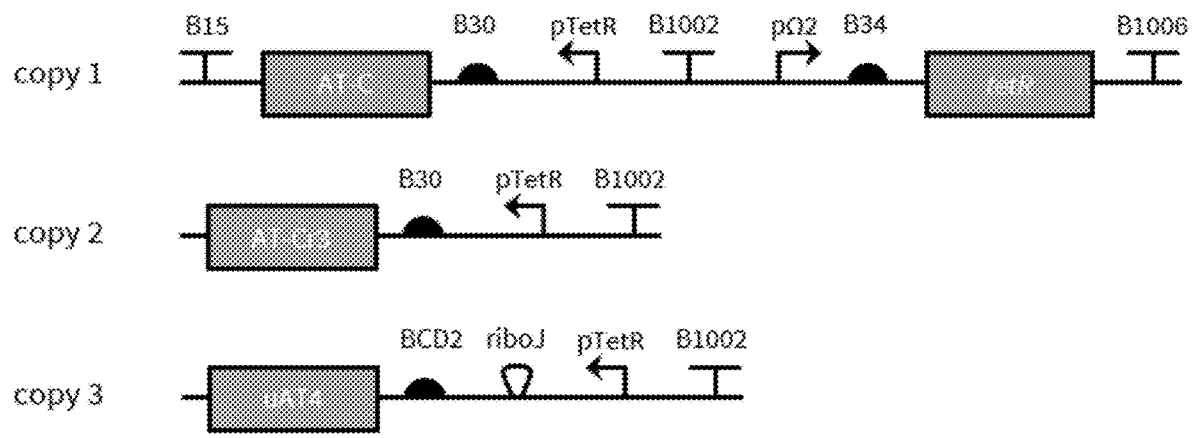

Additionally, FIGS. 3E-3G illustrate systems to express more than one gene of interest via an inducible system—specifically, FIG. 3E illustrates a separate promoter for each GOI, while FIG. 3F illustrates a polycistronic system for expressing the multiple GOIs with a single promoter. In certain embodiments based on FIGS. 3E-3F, the multiple genes of interest are copies of the same gene (e.g., 2 copies of uAT), while certain embodiments will introduce single copies of multiple genes (e.g., 1 copy of uAT and 1 copy of another gene of interest). In many embodiments, additional genes of interest will be selected from genes that enhance ammonia production and/or release from a cell. Certain embodiments will include reporter genes (e.g., green fluorescent protein; GFP). A number of embodiments will select additional genes of interest, including: amtB, fdxB, fdxN, fixX, GFP, RFP, and/or YFP. FIG. 3G further illustrates embodiments possessing multiple copies of inducible uATs in accordance with many embodiments. Specifically, FIG. 3G illustrates an inducible system possessing three copies of uATs, where each uAT is a different variant of a uAT at a different chromosomal location. For example, copy 1 shows an example with the AT-C (SEQ ID NO: 1) uAT, while copy 2 shows AT-Cr3 (SEQ ID NO: 8), which is a sequence variant of AT-C that produces the same peptide as AT-C, but the sequence variation limits recombination between the two copies. Further, copy 3 possesses the uAT, uAT4 (SEQ ID NO: 4). By placing multiple uAT copies at different chromosomal locations, certain embodiments may prevent native machinery from recombining or excising (thus deactivating) all uAT copies simultaneously. The use of different uAT variants may provide additional stability between the copies and make the deactivation of these genes more difficult, which is further described herein, as deactivating multiple uATs is more difficult than deactivating a single uAT. It should be noted that while FIGS. 3E-3G illustrate embodiments with two GOIs, a number of embodiments will include 3 or more genes of interest in an expression system. Further embodiments will delete all but one copy of GS genes within a diazotroph's genome. With one remaining GS gene, this GS gene can be deactivated with at least one uAT transformed into the diazotroph.

Figure 4A:
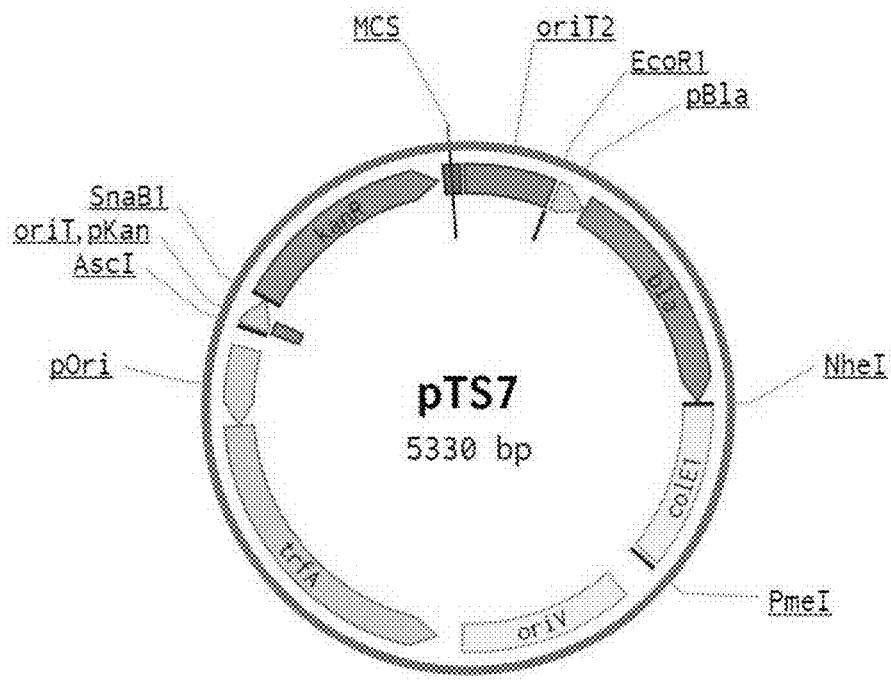
FIGS. 4A-4B illustrate exemplary plasmids for genetic transformation in accordance with various embodiments of the invention.
Figure 4B:
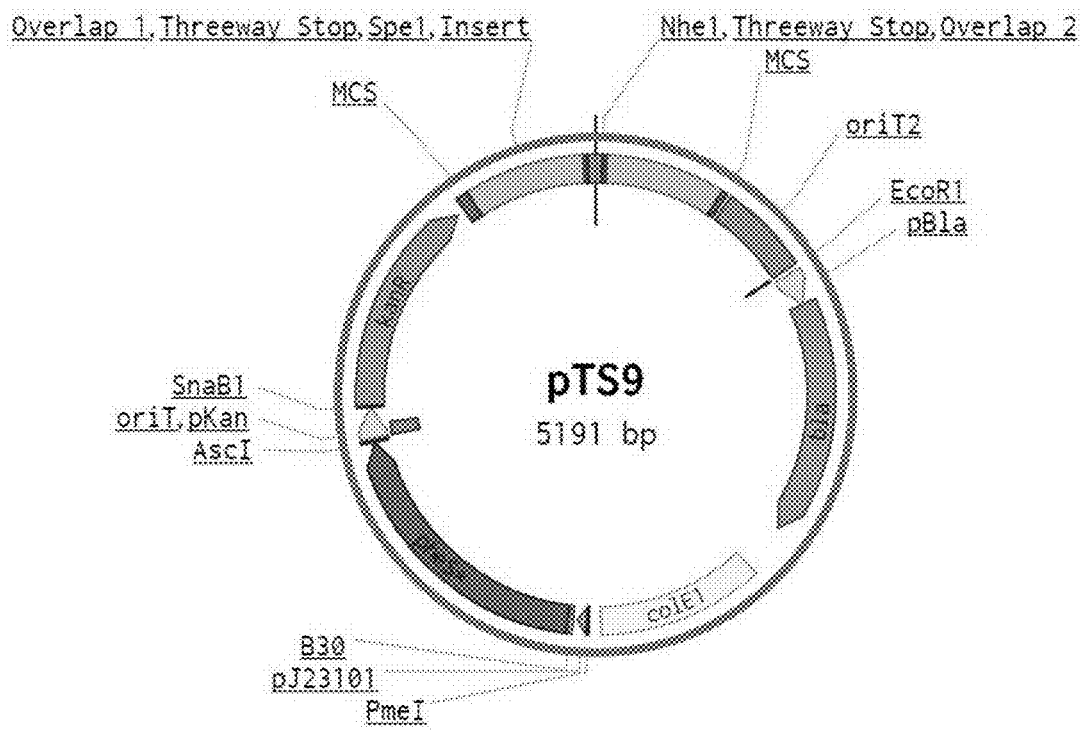

Many embodiments will be directed to engineered organisms that express one or more uATs, such that native GS will be deactivated. In these embodiments, deactivating native GS will block glutamine synthesis and allow release and/or production of ammonia from the organism. Various embodiments will place uATs into replicative plasmids, while additional embodiments will place uATs in integrative plasmids. FIGS. 4A-4B illustrate exemplary replicative (FIG. 4A) and integrative (FIG. 4B) plasmids in accordance with many embodiments. Integrative plasmids allow for integration of a genetic circuit into chromosomal DNA of a recipient diazotroph. Integration can either occur by single or double homologous recombination, for example FIG. 3G copies are integrated by double homologous recombination. A number of embodiments will deactivate the native ATase gene within the organism being engineered, such that the native ATase will not reactivate GS via hydrolysis of an adenylyl group. One of skill in the art will understand methods to deactivate innate ATases, including via deletion, mutation, and/or any other suitable method to remove innate ATase activity. Once uATs are placed into plasmids (replicative or integrative), diazotrophs of a number of embodiments will be transformed with these plasmids. One of skill in the art will understand a number of methodologies for introducing plasmids into diazotrophs, including one or more of the following: electroporation, particle bombardment, mediated transformation (e.g., viral vector or transposase driven), conjugation (e.g., with donor or donor and helper conjugation systems), heat shock, and/or any other method that will yield stable transformation of uATs into a diazotroph.

Ammonia Production and GS Regulation

Figure 5A:
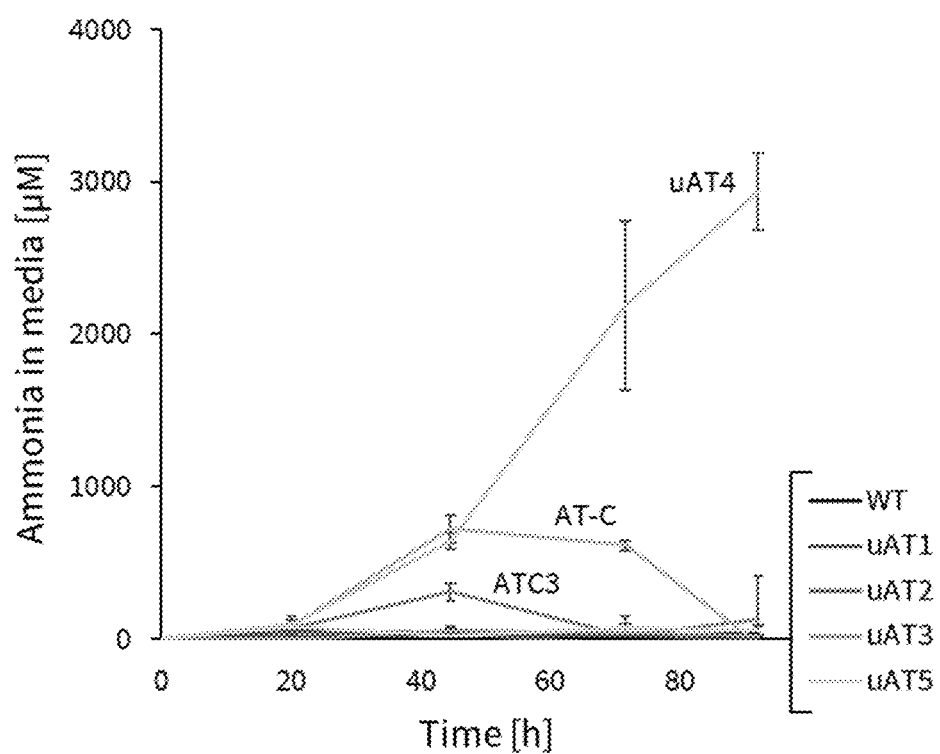
FIG. 5A illustrates ammonia production levels of exemplary embodiments of uATs in accordance with various embodiments of the invention.
Figure 5B:
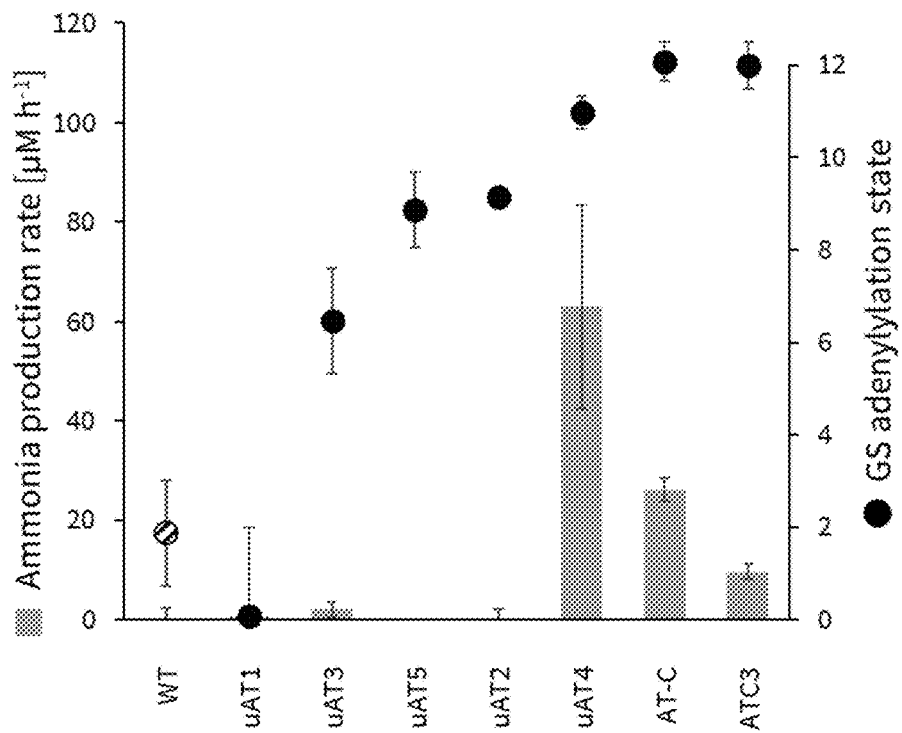
FIG. 5B illustrates ammonia production rates and glutamine synthetase adenylylation states of exemplary embodiments of uATs in accordance with various embodiments of the invention.

Many embodiments of diazotrophs will produce ammonia after transformation with uAT. Turning to FIG. 5A, ammonia production in a number of embodiments are illustrated. In particular, FIG. 5A illustrates that a number of embodiments are capable of producing ammonia in media at levels of approximately 0.3 mM to approximately 3 mM at certain inoculating ODs. Additionally, FIG. 5B illustrates the adenylylation state of GS and ammonia production in embodiments transformed with a number of uATs. In particular, these data show how a number of uATs increase the adenylylation state, leading to deactivation of GS as well as ammonia production in these embodiments. In *A. brasilense*, GS has a maximum adenylylation state of 12, representing the 12 possible adenylylation sites on the enzyme. In FIG. 5B, uATs with an adenylylation state of 8 or less did not produce ammonia in a significant quantity (e.g., uAT1, uAT2, uAT3, uAT5), indicating that many embodiments will be directed to uATs capable of creating a GS adenylylation state of 9 or greater.

Figure 6A:
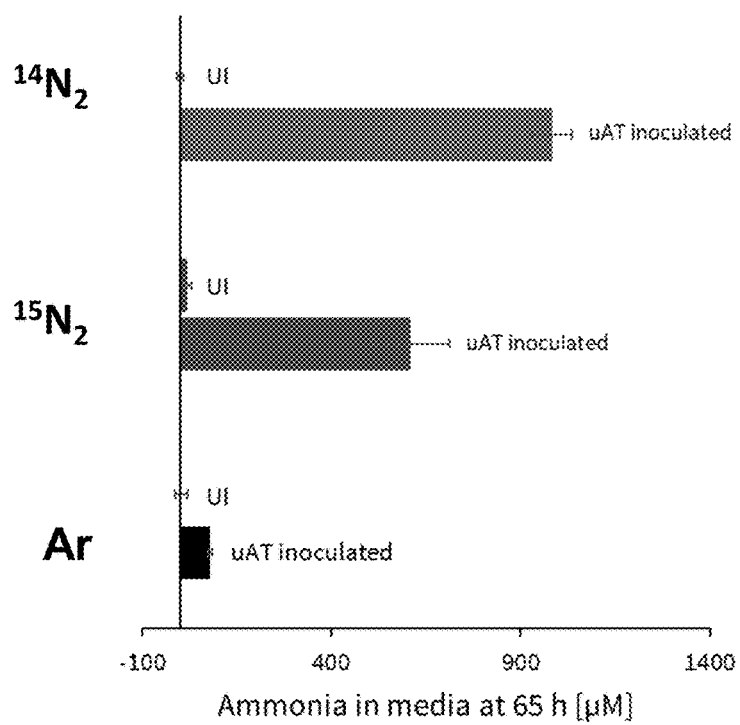
FIGS. 6A-6B illustrate incorporation of nitrogen gas ($N_2$) after inoculation of diazotrophs with uATs in accordance with various embodiments of the invention.
Figure 6B:
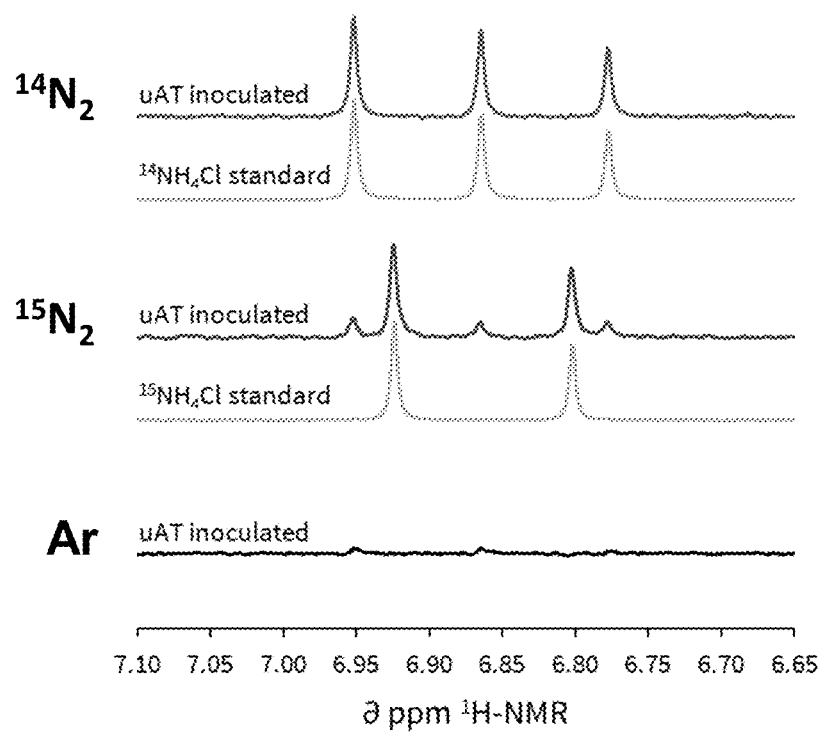

Turning to FIGS. 6A-6B, the ammonia production is due to nitrogen fixation from embodiments in controlled atmospheres. In particular, FIG. 6A illustrates ammonia production of uAT expressing diazotrophs inoculated into media in accordance with many embodiments as well as an uninoculated (UI) control in atmospheres of $^{14}N_2$, $^{15}N_2$, and Ar, showing that the introduction of a uAT expressing diazotroph of many embodiments leads to ammonia production. Further, FIG. 6B illustrates NMR results of the ammonia produced in the controlled environments, where the ammonia produced matches the isotopic nitrogen gas, thus the ammonia is coming from embodiments expressing a uAT and not an outside source.

Figure 7A:
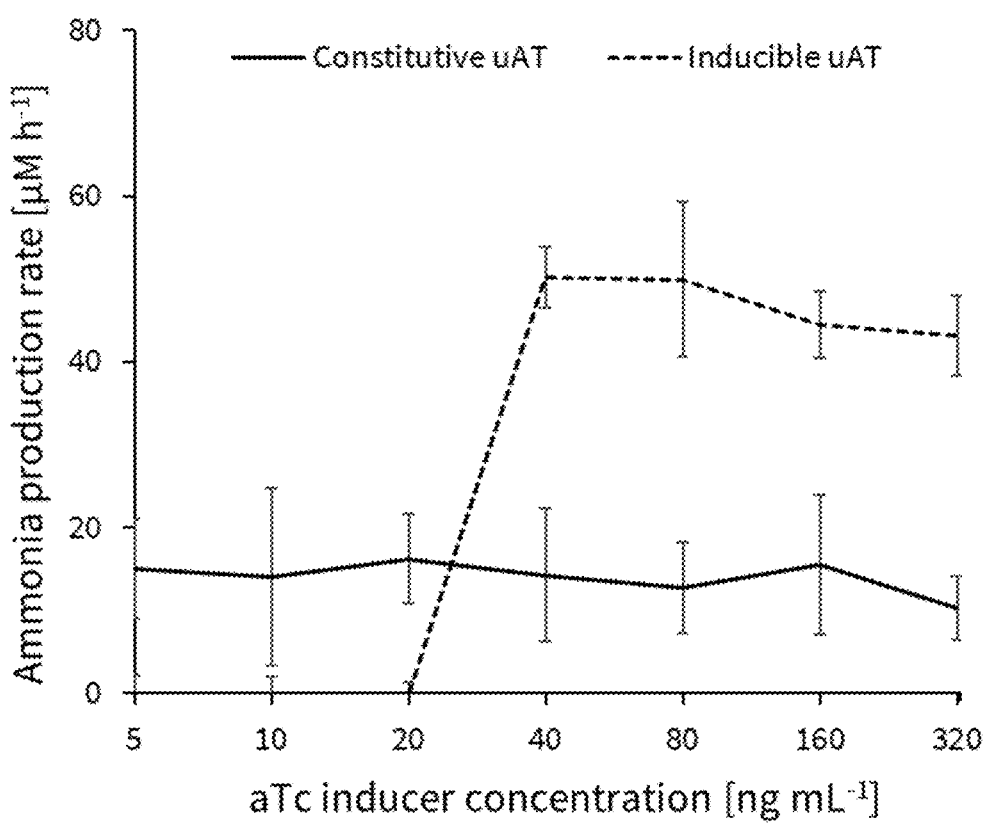
FIGS. 7A-7C illustrate ammonia production rates of exemplary embodiments of uATs in accordance with various embodiments of the invention.
Figure 7B:
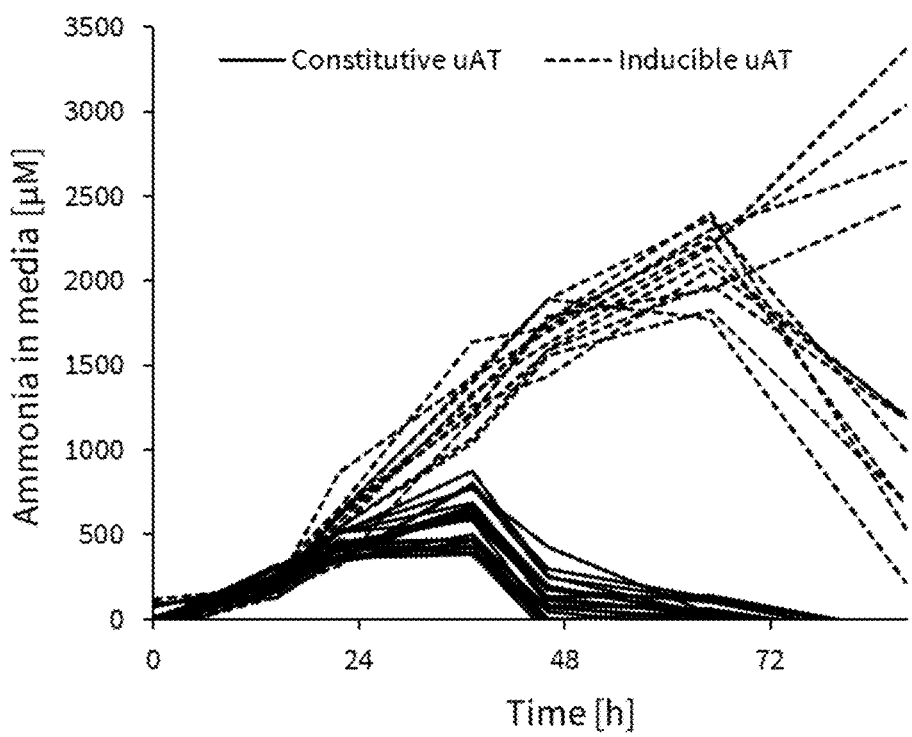

Turning to FIGS. 7A-7B, ammonia production in embodiments of constitutive and inducible uATs are illustrated. In FIGS. 7A-7B, a uAT in accordance with certain embodiments was placed in a constitutive expression system (e.g., FIGS. 3A-3B) and an inducible expression system (e.g., FIGS. 3C-3F). As an inducer concentration (x-axis) was increased, the inducible system embodiments (dashed line) were activated and produced ammonia at a rate of approximately 50 µM/hr at certain inoculating ODs, while constitutive embodiments produced maintained an approximately 18 µM/hr production rate at the same inoculating OD and independent of an inducer concentration. FIG. 7A illustrates that embodiments with inducible systems may be capable of producing ammonia at a higher rate than constitutive systems. Turning to FIG. 7B, embodiments with inducible uATs are capable of outlasting constitutive uAT embodiments. Specifically, the total ammonia in media concentration is plotted against time with a number of constitutive uAT embodiments (solid lines) and inducible uAT embodiments (dashed lines). The reduction of ammonia in media indicates that certain diazotrophs may compete against the uAT to return glutamine production from the produced ammonia. As shown in FIG. 7B, constitutive uAT embodiments begin to lose ammonia in concentration after approximately 36 hours, while several inducible systems produce ammonia until approximately the 72-hour mark, before the ammonia concentration begins to fall. It should be noted that a number of inducible uAT embodiments did not illustrate a reduction in ammonia within the timeframe of this figure.

Figure 7C:
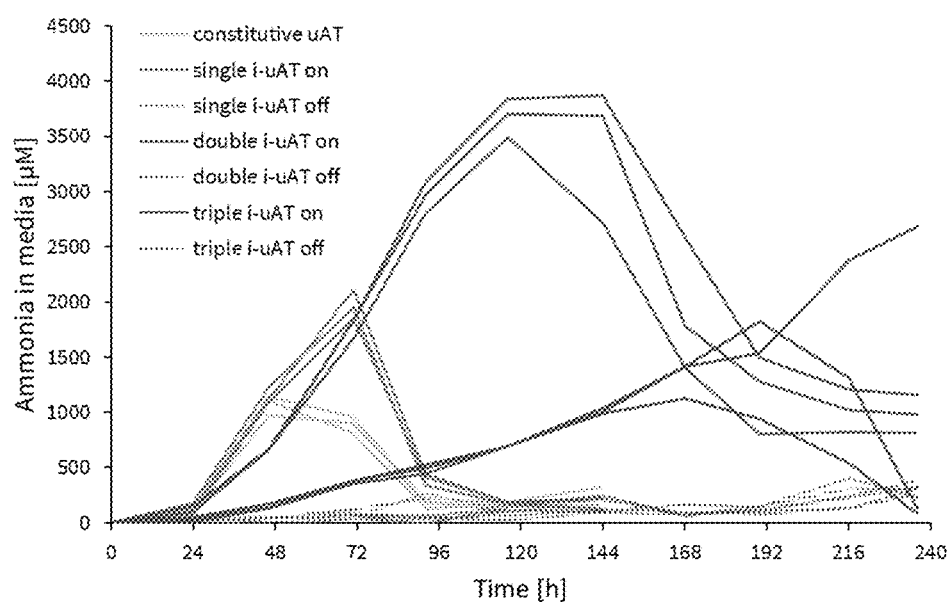

In FIG. 7C, the ammonia concentration over time of embodiments with a constitutive uAT and embodiments of various copies of inducible uATs is illustrated. Specifically, FIG. 7C illustrates that a constitutively active uAT peaked at approximately 1 mM at approximately 48 hours, while embodiments with one inducible uAT copy peaks at approximately 2 mM at 72 hours, embodiments with two inducible uAT copies peaks at approximately 4 mM at 120 hours, and embodiments with three inducible uAT copies peaks at approximately 2 mM at 192 hours, indicating that multiple copies of uATs in many embodiments increases the stability of ammonia production.

A number of embodiments will transform uAT into one or more of the following diazotrophic organisms: Proteobacteria (such as *Pseudomonas, Enterobacter, Stenotrophomonas, Burkholderia, Rhizobium, Herbaspirillum, Pantoea, Serratia, Rahnella, Azospirillum, Azorhizobium, Azotobacter, Duganella, Delftia, Bradyrhizobium, Sinorhizobium,* and *Halomonas*), Firmicutes (such as *Bacillus, Paenibacillus, Lactobacillus, Mycoplasma,* and *Acetobacterium*), and Actinobacteria (such as *Streptomyces, Rhodococcus, Microbacterium,* and *Curtobacterium*. Different diazotrophic organisms may occupy or colonize different root niches. Certain embodiments will transform and apply a consortium of diazotrophic organisms. By applying a consortium of symbiotic diazotrophs, many embodiments can maximize the amount of fixed nitrogen supplied to a plant.

Increasing Plant Growth

Figure 8A:
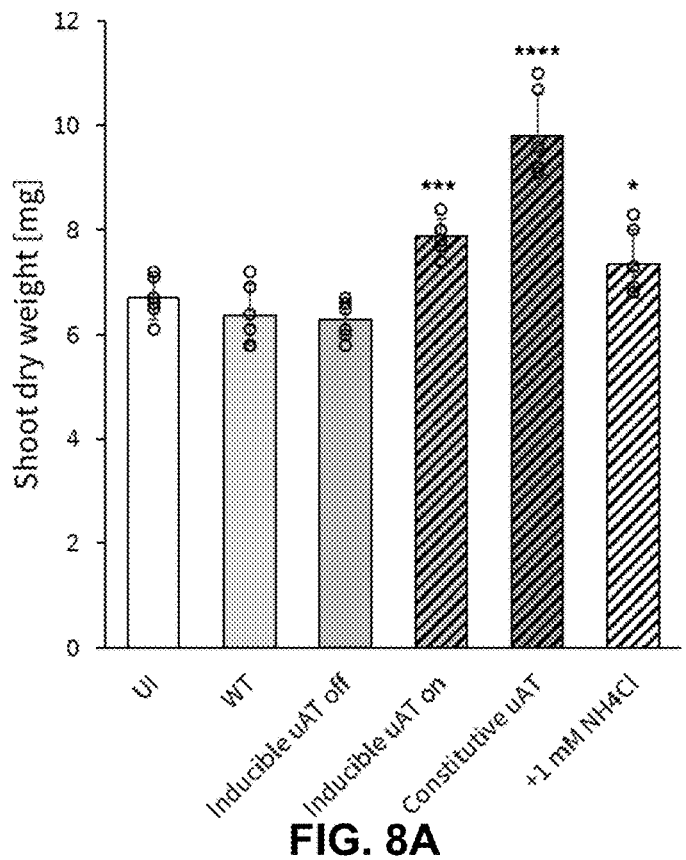
FIGS. 8A-8C illustrate plant growth and health indicators of plants after growth with engineered diazotrophs in accordance with various embodiments of the invention.
Figure 8B:
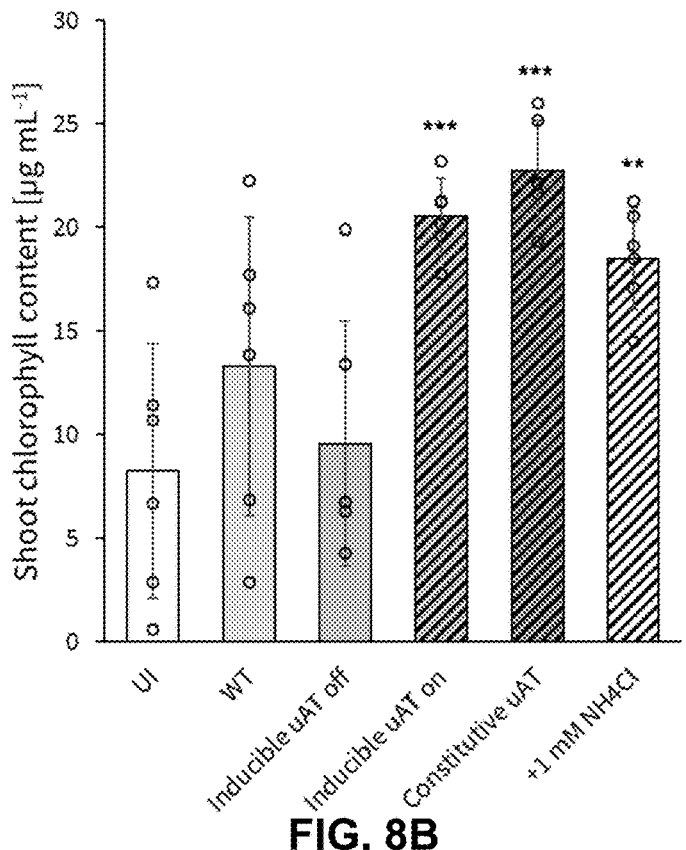
Figure 8D:
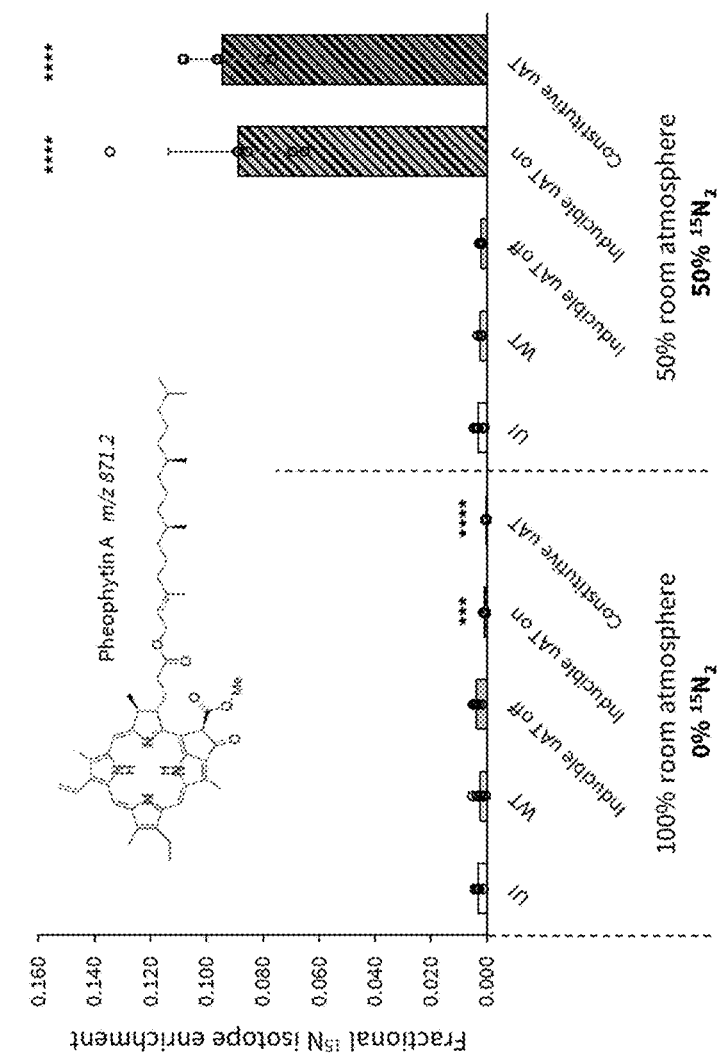
FIG. 8D illustrates incorporation of $N_2$ into pheophytin in accordance with various embodiments of the invention.
Figure 8C:
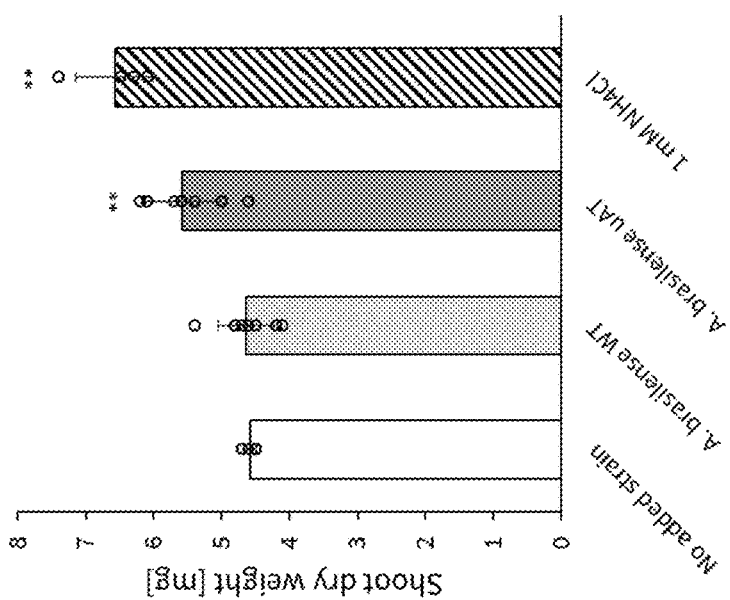

Turning to FIGS. 8A-8C, a number of embodiments are capable of increasing plant growth. In particular, FIGS. 8A and 8B illustrate shoot dry weight and shoot chlorophyll content, respectively, of plants grown in media with uninoculated diazotrophs (UI), wild type diazotrophs (WT), diazotrophs with an inducible uAT without induced expression (Inducible uAT off), diazotrophs with an inducible uAT with induced expression (Inducible uAT on), diazotrophs with a constitutive uAT (Constitutive uAT), and plants supplemented with NH$_4$Cl. Similarly, FIG. 8C illustrates plants grown in a nitrogen-poor soil mimic with a complex microbial community (e.g., background soil bacteria, fungi, etc.) inoculated with no additional microbial strain (No added strain), a wild type diazotroph (*A. brasilense* WT), a diazotroph with constitutive uAT (*A. brasilense* uAT), and supplemented with NH$_4$Cl. FIGS. 8A-8C illustrate that diazotrophs with uATs of many embodiments are capable of increasing plant growth and chlorophyll content, indicating better plant health and growth, even in environments where resource competition and ammonia scavenging may exist.

Turning to FIG. 8D, the increased plant growth is due to nitrogen fixation from embodiments of diazotrophs with uAT. Specifically, FIG. 8D illustrates the fractional $^{15}N$ isotope enrichment in pheophytin, a plant-specific chlorophyll derivative. FIG. 8D shows plants grown in a standard atmosphere and plants grown in an atmosphere containing 50% $^{15}N_2$, where pheophytin of plants inoculated with embodiments of diazotrophs with constitutive uAT (Constitutive uAT) and inducible uAT with induced expression (Inducible uAT on) possess an amount of $^{15}N$, indicating that the ammonia produced in embodiments is bio-available to plants.

Pre-Transcriptional GS Deactivation

Figure 9A:
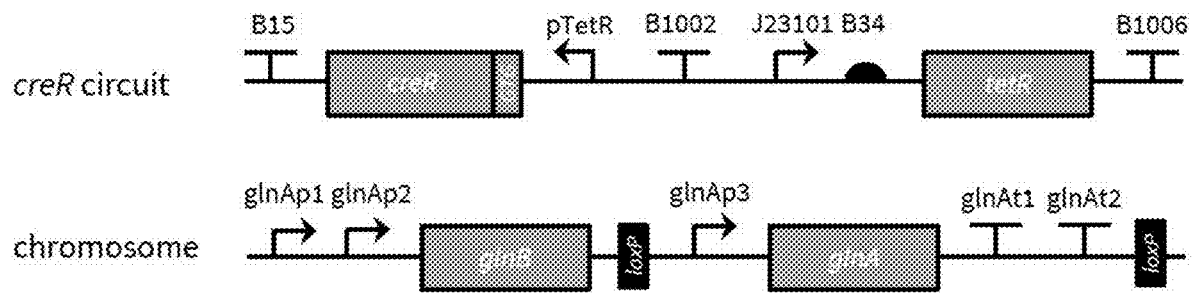
FIG. 9A illustrates an exemplary genetic expression circuit in accordance with various embodiments of the invention.
Figure 9B:
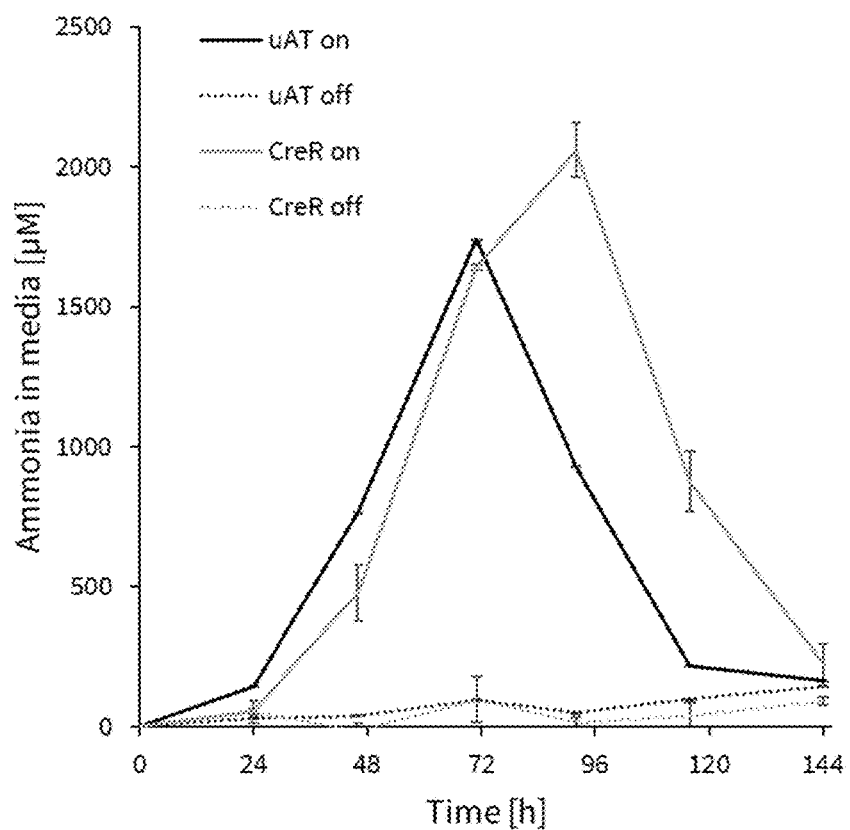
FIG. 9B illustrates ammonia production levels of exemplary embodiments of uATs and CreRs in accordance with various embodiments of the invention.

FIGS. 9A-9B illustrate systems for pre-transcriptional control of GS in accordance with some embodiments. In particular, FIG. 9A illustrates a system of pre-transcriptional control of a GS in accordance with a variety of embodiments. In certain pre-transcriptional control embodiments, Cre recombinase (CreR) is used to excise the GS encoding gene (e.g. glnA) from a diazotroph. In some of these embodiments, an expression system containing the Cre recombinase is introduced into a diazotroph. Further, these embodiments will also introduce flanking loxP sites (SEQ ID NO: 10), where a loxP sequence (SEQ ID NO: 10) is introduced before and after the GS encoding gene. It should be noted that a system, such as illustrated in FIG. 9A could be combined with a multi-gene system, such as those illustrated in FIGS. 3E-3G to increase stability of certain diazotrophs. Certain embodiments will introduce loxP sites flanking all GS genes, not just glnA, within an organism to prevent the synthesis of glutamine and maintain accumulation of ammonia. Further embodiments will delete all but one GS within a diazotroph and flank the one remaining GS with loxP sites. Additional embodiments will use additional recombinase systems known in the art to control GS expression.

FIG. 9B illustrates the ammonia concentration of inducible uAT and inducible CreR diazotrophs in accordance with certain embodiments. As illustrated, when the inducible uAT and inducible CreR embodiments are not induced, ammonia concentration remains close to zero, as GS is active, and ammonia is used to synthesize glutamine. However, when the inducible uAT or inducible CreR are activated using an inducer (e.g., tetracycline), ammonia concentration increases to a peak of approximately 1.7 mM at 72 hours in the inducible uAT embodiments, while the ammonia concentration peaks at approximately 2 mM at 96 hours in the inducible CreR embodiments.

Methods of Increasing Bio-Available Nitrogen in Soil

Figure 10:
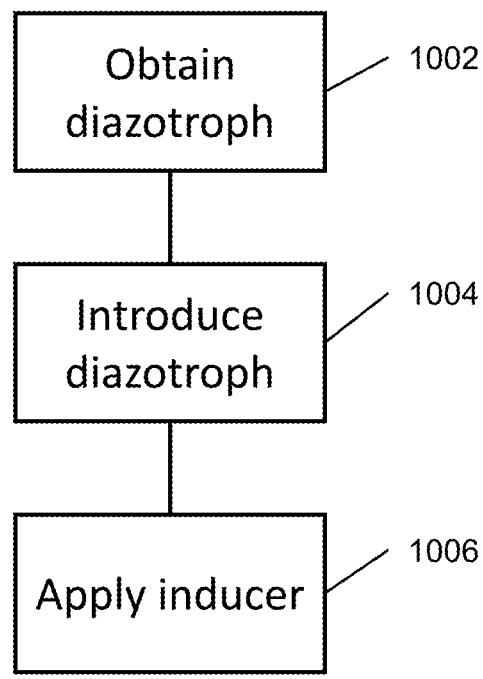
FIG. 10 illustrates a flow chart of a method of increasing bio-available nitrogen in soil in accordance with various embodiments of the invention.

Turning to FIG. 10, a number of embodiments are directed to methods of increasing bio-available nitrogen in soil. In particular, FIG. 10 illustrates a method 900 to increase bio-available nitrogen. At step 1002, many embodiments will obtain a diazotroph in accordance with embodiments described herein. In certain embodiments, the diazotroph is capable of post-transcriptionally deactivating GS via adenylylation, while additional embodiments will deactivate GS pre-transcriptionally, such as by excising a GS gene. Certain embodiments will possess an inducible system for deactivating GS, while some embodiments will constitutively deactivate GS. Embodiments of post-transcriptional and excising diazotrophs are described elsewhere within this disclosure. A number of embodiments will obtain more than one diazotroph species.

At Step 1004, numerous embodiments will introduce a diazotroph in accordance with embodiments described herein to an agricultural media. Different types of media exist for use in embodiments, including media such as soil, potting mix, or growth media. In accordance with various embodiments, agricultural media includes media in an agricultural field, a greenhouse, a growth chamber, an agricultural hydroponic system, and/or or any other environment for growing plants. A number of embodiments will introduce the diazotrophs in any suitable method, such as by spraying liquid culture to the soil, seed coatings, applying pelletized or dry formulations of the diazotrophs to the soil. Certain embodiments will apply the diazotrophs before planting crops in the soil, while some embodiments will apply the diazotrophs after planting crops in the soil. Certain embodiments will apply diazotrophs multiple times during a plant growth season, such that multiple applications will occur periodically through a season. Certain embodiments will apply multiple types of diazotrophs (e.g., post-transcriptionally deactivating GS and excising diazotrophs) within a single application, while some embodiments will apply different types of diazotrophs at different times during a plant growth season. One of skill in the art will understand application methods to apply the diazotrophs to soil through various methods, including via air, tractor, manual, etc. spraying methods.

Many embodiments will apply an inducer to the soil at step 1006. In certain embodiments, the inducer activates a diazotroph with an inducible mechanism, such as an inducible uAT, such as those described herein. In various embodiments the inducer will be applied as a liquid, while some embodiments will apply the inducer dry. One of skill in the art will understand application methods to apply an inducer to soil through various methods, including via air, tractor, manual, etc. spraying methods. In other embodiments, diazotrophs will be induced prior to application, or induced by removal of a small molecule.

While FIG. 10 illustrates a method to increase plant growth and production, one of skill in the art would understand that certain steps may be performed in a different order, simultaneously, and/or omitted in accordance with the specifics of certain embodiments. For example, when using a constitutive embodiment, application of an inducer would not be necessary to activate any gene within a diazotroph. Additionally, certain embodiments will apply the inducer simultaneously with an inducible system, when immediate activation of a gene of interest is desired by a user.

EXEMPLARY EMBODIMENTS

Although the following embodiments provide details on certain embodiments of the inventions, it should be understood that these are only exemplary in nature, and are not intended to limit the scope of the invention.

Example 1

Engineering Diazotrophs Produce Ammonia

BACKGROUND: Native diazotrophs will produce and consume ammonia to generate glutamine. Production of ammonia for exogenous use will require custom diazotrophs to prevent the consumption of ammonia by the diazotroph.

METHODS: All plasmids were assembled following standard protocol using Phusion polymerase and Gibson assembly. A PCR extension time of 24 s/kb was found to work best for high GC content assemblies. Standard synthetic parts from the BioBrick library were used in all genetic circuits. NEB E. coli DH5 alpha cells were used for plasmid propagation. Replicative plasmids (e.g., FIG. 4A) were transformed into A. brasilense Sp245 by electroporation of 1000 ng of DNA at 1.25 kV/cm and 200Ω and 25 µF. A. brasilense electrocompetent cells were prepared as follows: cells were grown to OD 0.5 in LB media at 30° C. and 300 rpm, then rapidly cooled on ice and pelleted; cells were triple washed with ice cold 10% glycerol and flash frozen at high concentration in liquid nitrogen. Chromosomally integrative plasmids (e.g., FIG. 4B) were introduced by conjugation into A. brasilense by triparental mating using E. coli DH5 alpha as the donor strain and E. coli RK600 as the helper strain. For conjugation, all stains were grown on LB agar plates at 37° C. overnight. During grow-up, the donor plasmids were retained with 50 µg/mL kanamycin and the helper plasmid with 100 µg/mL chloramphenicol. Cells were scraped from plates at a ratio of 5:1:1 recipient to helper to donor, resuspended in 1 mL LB, pipette mixed, pelleted, dripped at high concentration onto antibiotic free LB agar, and incubated at 37° C. overnight. Transformants were selected on LB agar with 50 µg/mL kanamycin and 10 µg/mL streptomycin and re-streaked 3 times to ensure proper isolation. For double homologous recombination, negative selection was performed with 5 mM 4-chlorophenylalanine in minimal NFbHP media with 5 mM glutamine as the nitrogen source. NFbHP media contained 5 g/L sodium lactate, 1.7 mM sodium chloride, 811 µM magnesium sulfate, 180 µM calcium chloride, and 72 µM iron sulfate. Phosphates were stored separately and added to 34.4 mM dipotassium phosphate and 29.4 mM monopotassium phosphate. Trace elements were added to 1× from the following 50× stock solution: 4.5 mM boric acid, 1.4 mM manganese sulfate, 826 µM sodium molybdate, 86 µM zinc sulfate, and 32 µM copper sulfate. Colonies post-conjugation were inoculated until growth was observed (2-5 days) at 37° C. and 300 rpm, plated on antibiotic free LB, and screened by PCR for successful double recombination. All strains were stored at −80° C. in 1:1 LB to glycerol.

To assay GS activity, *A. brasilense* strains were plated on LB agar plates from glycerol stocks and grown at 30° C. for 2 days. Single colonies were then inoculated into 5 mL NFbHP media with 5 mM glutamine and grown for overnight at 30° C. and 300 rpm. Cultures were pelleted, triple washed with 1% potassium chloride, and inoculated at OD600 0.1 (unless noted otherwise) at a volume of 3 mL in semisolid NFbHP in 12 mL polypropylene culture tubes. NFbHP was turned semisolid by addition of 0.175% agar. Plasmids were retained with 50 µg/mL of kanamycin at all steps. Glutamine synthetase γ-glutamyl hydroxamate activity was determined based on previously reported procedures. (See e.g., Goldberg, R. B. & Hanau, R. Relation between the adenylylation state of glutamine synthetase and the expression of other genes involved in nitrogen metabolism. J Bacteriol 137, 1282-1289 (1979); the disclosure of which is incorporated by reference herein in its entirety.) All buffers were prepared fresh. After 24 h, cells were permeabilized by addition of 0.1 mg/mL CTAB and 0.25 mM manganese chloride at room temperature for 5 minutes, and then pelleted. Pellets were washed with ice-cold 1% potassium chloride. Per strain, 6 tubes of each 3 mL culture were combined and concentrated to 4 mL and stored at 4° C. until analysis. 5× concentrated assay mixture was prepared as follows: 675 mM imidazole hydrochloride buffer, 125 mM potassium arsenate, 100 mM hydroxylamine hydrochloride, 1.25 mM manganese chloride, 0.5 mg/mL CTAB. The pH was adjusted to 7.50 at 30° C., the isoactivity point of *A. brasilense* GS and GS-AMP in this assay as reported previously. (See e.g., Pirola, M. C., et al. Isolation and characterization of glutamine synthetase from the diazotroph *Azospirillum brasilense*. International Journal of Biochemistry 24, 1749-1754 (1992); the disclosure of which is incorporated by reference herein in its entirety.) 4× concentrated start mixture was made to 300 mM glutamine and the desired ADP concentration. Then, in 96 well format, 60 µL of 5× assay mixture was added to 150 µL of cell concentrate and equilibrated at 30° C. for 5 minutes. Reactions were initiated by addition of 75 µL of 4× start mix and took place under static conditions at 30° C. At each time point (0, 5, 10, and 15 minutes), 66 µL of the reactions was pipetted into a plate prepared with 133 µL stop mix containing 55 g/L iron chloride, 20 g/L trichloroacetic acid, and 21 mL/L concentrated hydrochloric acid. Absorbance at 540 nm was measured using the Synergy HTX plate reader. All reactions were prepared in n=4 technical replicates. Standard curves were determined by adding known concentrations of γ-glutamyl hydroxamate to the stop mix. Rates of γ-glutamyl hydroxamate formation were normalized to total protein content in reactions that was determined using the standard Bradford assay on the cell concentrate.

To assay ammonia production, *A. brasilense* strains were cultured as described for the GS activity assay. Inducible strains were switched on within 30 minutes post inoculation by addition of 200 ng/mL anhydrotetracycline, unless noted otherwise. Cultures were incubated statically at 30° C. Samples of 200 µL were taken at time points and pelleted. 120 µL of supernatant was stored at −20° C. until analysis. 20 µL of each sample was analyzed in 96-well PCR plate format using a modified version of the previously described indophenol procedure: 120 µL of 150 mM sodium acetate pH 3.7 was added, followed by 80 µL of saturated chlorine water and 30 µL of freshly prepared 8% phenol in water. (See e.g., Bolleter, W. T., et al. Spectrophotometric Determination of Ammonia as Indophenol. Analytical Chemistry 33, 592-594 (1961); the disclosure of which is incorporated herein in its entirety.) Plates were immediately incubated at 95° C. for 5 minutes in a thermocycler and then rapidly cooled in cold water. Color was developed by addition of 100 µL of 500 mM borate buffer pH 12.5. 200 µL of each reaction was transferred to a clear bottom 96-well polystyrene plate and analyzed for absorbance at 625 nm using the Synergy HTX plate reader. On-plate standards were run for every plate using uninoculated reaction buffer and ammonium chloride as the standard. Mutants were monitored by plating ammonia producing cultures onto LB again and analyzing individual colonies by PCR at loci of interest.

For NMR analysis, strains were prepared as for the ammonia production assay with the following modifications: culture volumes were 5 mL in 25 mL scintillation vials capped with a rubber stopper. The headspace was replaced with 20 mL $^{15}N_2$ gas, $^{14}N_2$ gas, or Argon. Then 5 mL was displaced with $O_2$ and vials were incubated at 30° C. for 65 h. Following incubation, cultures were uncapped, pelleted, and the supernatant frozen at −20° C. until analysis. Samples were quantified for ammonia using the indophenol method as described, and prepared for $^1$H-NMR analysis by addition of 50 µL deuterated DMSO and 25 µL concentrated HCl to 425 µL sample. Standards were prepared equivalently, using 10 mM $^{14}NH_4Cl$ and 10 mM $^{15}NH_4Cl$ in uninoculated culture buffer. Spectra were collected using an INOVA 600 Oxford NMR with a 64-scan selective pulse sequence for ammonia as reported previously. (See e.g., Nielander, A. C. et al. A Versatile Method for Ammonia Detection in a Range of Relevant Electrolytes via Direct Nuclear Magnetic Resonance Techniques. ACS Catalysis 9, 5797-5802 (2019); the disclosure of which is incorporated herein in its entirety.)

RESULTS: As illustrated in FIG. 5A, ammonia was not detected in the media of the WT strain—as expected—but several of the uAT expressing *A. brasilense* ΔglnE strains did result in 0.3-3 mM levels of ammonia accumulation over 2-4 days. As previously described, GS is a homododecamer and has 12 total adenylylation sites, thus the maximal adenylylation (shutdown) state is 12. FIG. 5B illustrates that ammonia accumulates in the media when average adenylylation levels exceed 11—see strains, uAT4, AT-C, and ATC3. uAT2 and uAT5, conferred slightly lower adenylylation levels of 9 and did not lead to detectable levels of ammonia. These data confirm that the inability to assimilate ammonia through GS deactivation results in its extracellular release, and suggest that an average adenylylation threshold between 9 and 11 is required to sufficiently deactivate GS for ammonia accumulation. Additionally, FIG. 7C illustrates improved evolutionary stability in strains possessing multiple copies of an inducible uAT.

FIG. 3C illustrates an *A. brasilense* ΔglnE embodiment carrying an inducible circuit with an AT-C (SEQ ID NO: 1) uAT in nitrogen free media under controlled atmosphere conditions of 20% $O_2$ and 80% of either $^{14}N_2$, $^{15}N_2$, or Argon. Since commercial $^{15}N_2$ gas often contains small amounts of $^{15}NH_3$, the quantitative indophenol assay was performed to verify that no appreciable amounts of ammonia were in the media above the assay detection threshold of 10 μM (FIG. 6A). Next, media of inoculated vials was analyzed using proton nuclear magnetic resonance ($^1$H-NMR) with a previously reported pulse sequence optimized for the detection of ammonia. (See e.g., Nielander, A. C. et al. ACS Catalysis 9, 5797-5802 (2019) (cited above).) $^1$H-NMR is ideally suited for this kind of analysis as isotopically unique differences in nuclear spin manifest as distinctive coupling constants inherently observed by NMR techniques. Thus, $^{14}NH_4^+$ and $^{15}NH_4^+$ are readily distinguishable owing to the different nuclear spins of each isotope. $^{14}NH_4^+$, with a spin=1, appears as a 1:1:1 triplet with $^1J_{H-N}$=51 Hz while $^{15}NH_4^+$, with a spin=1/2, appears as a 1:1 doublet with $^1J^{H-N}$=72 Hz. We find that the $^{15}N_2$ atmosphere samples do indeed show a predominant doublet with $^1J^{H-N}$=73 Hz, from which we conclude that ammonia in the media is de novo fixed from gaseous nitrogen (FIG. 6B).

AT-C (SEQ ID NO: 1) on the inducible circuit illustrated in FIG. 3C from plasmid pTS7: in the same nitrogen fixing conditions as before, no ammonia production was detected (off-state) until the inducer concentration reaches 20-40 ng/mL anhydrotetracycline, above which ammonia production is constant (on-state) with respect to inducer concentration at average rates of 50 μM $h^{-1}$ for approximately 70 hours (FIGS. 7A-7B). The inducible on-state ammonia production rate is twice as high and lasts twice as long as the equivalent constitutive strain performance FIG. 7B). Ammonia production rates were found to scale robustly with OD but require sufficient surface area for gas exchange with the atmosphere at higher OD.

CONCLUSION: This proof-of-concept study demonstrates the ability to engineer diazotrophs to produce ammonia, which can be released into solution.

Example 2

Plant Growth Enhancement

BACKGROUND: Plants, especially many crops, will benefit from additional sources of bio-available nitrogen, such as ammonia. Ammonia producing diazotrophs, such as these embodiments, may provide a beneficial alternative to industrially generated nitrogen fertilizers.

METHODS: *S. viridis* A10 seeds were first surface sterilized in 10% bleach and 0.01% Tween-20 for 10 minutes, followed by a triple water wash, and then imbibed overnight at 30° C. 1/5 strength NFbHP with addition of 1 mM $NH_4Cl$, 0.5 mM calcium chloride, and 2% w/v sucrose was prepared to a semisolid state (0.175% agar) as described. Post imbibition, seeds were planted on 1.2 $cm^2$ PTFE mesh floating on 10 mL media in 50 mL capped glass tubes. Growth chamber conditions were as follows: 16 h light cycles with 30° C. light and 24° C. dark temperatures, at a relative humidity of 50%. Strains were prepared as described for the ammonia assay and inoculated 14 days post planting to an OD600 of 0.1. Anhydrotetracycline was added to the relevant experimental groups at 200 ng/mL following inoculation. 14 days post inoculation, whole shoots were harvested and lyophilized overnight prior to dry weight determination.

At 14 days post planting—coincident with microbial inoculation—50% of the headspace in the label group was displaced with $^{15}N_2$ gas. Post lyophilization and dry weight collection, chlorophyll of shoots was extracted similar to previous reported methods. (See e.g., Kahn, M. et al. A mass spectrometry method for measuring N-15 incorporation into pheophytin, Vol. 307. (2002); and Parra-Colmenares, A. & Kahn, M. L. Determination of nitrogen fixation effectiveness in selected Medicago truncatula isolates by measuring nitrogen isotope incorporation into pheophytin. Plant and Soil 270, 159-168 (2005); the disclosures of which are incorporated herein in their entireties.) Whole shoots were treated as individual samples. Each sample was homogenized at 25 Hz for 2 minutes and extracted in 1.4 mL methanol for 2 h at room temperature. Leaf fragments were precipitated by centrifugation and 1 mL of supernatant was transferred to a new tube. 145 μL dioxane and 180 μL water were added and samples were chilled at −80° C. for 2 h. Chlorophyll was pelleted at 21,000 rcf for 15 minutes at 4° C., resuspended in 200 μL 1:1 methanol to acetone, and stored in this state for several days at −80° C. until analysis. Chlorophyll was then converted to pheophytin by addition of 1 μL concentrated hydrochloric acid and clarified for 2 minutes at 21,000 rcf. Standards were prepared from a chlorophyll authentic standard following the same pheophytin conversion method. Pheophytin isotope abundances were analyzed by quantitative time-of-flight (qTOF) mass spectrometry on an Agilent 6545 LC-MS. For this, 5 μL of sample was directly injected into the MS in electrospray ion positive mode with a fragmentor voltage of 175 V and capillary voltage of 3500 V. 10% water in acetonitrile and 0.1% formic acid was used as the solvent at a flowrate of 0.6 mL/min with a sheath gas flow of 12 L/min at 300° C., drying gas flow of 12 L/min at 250° C., and a nebulizer pressure of 10 psi. Mass-isotopomer distributions (MIDs) were computationally extracted from raw data as previously reported. (See e.g., Nett, R. S. et al. D2O Labeling to measure active biosynthesis of natural products in medicinal plants. AIChE Journal 64, 4319-4330 (2018); the disclosure of which is incorporated herein in its entirety.)

For complex community analyses, *S. viridis* A10 seeds were surface sterilized as described and planted on 5 mL calcined clay under the same growth conditions as described for minimal media methods. Soil filtrate was prepared by adding 10 mL of Horticulture 713405 HP Pro-Mix soil to 100 mL of water and stirred for 30 minutes at room temperature. 2 mL of this broth was applied to each tube at the time of planting. *A. brasilense* strains were cultured and prepared as described for minimal media methods and applied 9 days post planting as 500 μL of OD600 of 1 to each tube. Plants were harvested and processed as described in minimal media methods at 28 days post planting.

RESULTS: FIG. 8A illustrates significant growth promotion with both constitutively producing and inducible on-state strains at 54% and 24% over WT inoculated plants respectively. The wild type and inducible off-state inoculated samples showed no growth promotion, suggesting no native nitrogen transfer. In FIG. 8B, total chlorophyll content was also determined as metric for plant health: the results mirror dry weight conclusions, with an increase of 71% and 55% over WT for the constitutive and inducible on-state strains respectively. (See e.g., Liang, Y. et al. A nondestructive method to estimate the chlorophyll content of Arabidopsis seedlings. Plant Methods 13, 26 (2017); the disclosure of which is incorporated herein in its entirety.)

In complex microbial communities, no statistically significant difference between adding no additional strains at 9 days or adding *A. brasilense* WT was observed. Introduction of the constitutive uAT expressing chromosomal integration strain lead to a growth promotion of 20% over WT (p=0.001) (FIG. 8C). Even though a complex community background might limit strain performance through resource competition and ammonia scavenging, statistically significant growth promotion was still observed, which demonstrate practical promise for engineered biological nitrogen fixation.

FIG. 8D illustrates the incorporation of $^{15}N$ into pheophytin. In the 50% $^{15}N_2$ displaced atmosphere, no isotope enrichment above the $^{15}N$ natural abundance (0.4%) for uninoculated, WT, or inducible-off inoculated plants was observed. For the constitutive and inducible-on inoculated plants, 9.4±1.3% and 8.9±2.5% integration of $^{15}N$ atoms in the total N of pheophytin at high statistical significance ($p<10^{-4}$) was observed. This method is also precise enough to detect a statistically significant dilution of natural $^{15}N$ isotopes in plants grown under regular atmospheric conditions and inoculated with ammonia producing strains ($p<10^{-3}$). This isotope dilution occurs under significant de novo gaseous nitrogen influx because natural abundances of $^{15}N$ in biomass are higher than in the atmosphere. Taken together, the data demonstrate direct transfer of nitrogen gas to plants cultivated in the presence of engineered *A. brasilense*.

CONCLUSION: Various embodiments are capable of increasing plant growth and health by inoculation of media and soil with engineered diazotrophs capable of fixing nitrogen. Various embodiments show direct transfer for nitrogen gas from the air to plant molecules.

DOCTRINE OF EQUIVALENTS

Having described several embodiments, it will be recognized by those skilled in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Those skilled in the art will appreciate that the presently disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

TABLE 1 uATs in accordance with embodiments

| Name | Species | Amino Acid Range | SEQ ID NO |
|---|---|---|---|
| AT-C | *E. coli* | 423-946 | 1 |
| ATC3 | *E. coli* | 609-946 | 2 |
| uAT1 | *A. brasilense* | 449-1003 | 3 |
| uAT2 | *A. brasilense* | 625-1003 | 4 |
| uAT3 | *A. brasilense* | 481-1003 | 5 |
| uAT4 | *A. brasilense* | 506-1003 | 6 |
| uAT5 | *A. brasilense* | 529-1003 | 7 |

TABLE 2

Known diazotrophs

*Acidithiobacillus ferrooxidans* ATCC 23270
*Allochromatium vinosum* DSM 180
*Anabaena variabilis* ATCC 29413
*Arcobacter nitrofigilis* DSM 7299
*Azoarcus* sp. BH72
*Azorhizobium caulinodans* ORS 571
*Azospirillum* sp. B510
*Azotobacter vinelandii* AvOP
*Beijerinckia indica indica* ATCC 9039
*Bradyrhizobium japonicum* USDA 110
*Bradyrhizobium* sp. BTAi1
*Burkholderia* sp. CCGE1002
*Burkholderia vietnamiensis* G4
*Burkholderia xenovorans* LB400
*Chlorobaculum parvum* NCIB 8327
*Chlorobium limicola* DSM 245
*Chlorobium phaeobacteroides* BS1
*Chlorobium tepidum* TLS
*Clostridium acetobutylicum* ATCC 824
*Clostridium beijerinckii* NCIMB 8052
*Clostridium kluyveri* DSM 555
*Cupriavidus taiwanensis*
cyanobacterium UCYN-A
*Cyanothece* sp. ATCC 51142
*Dehalococcoides ethenogenes* 195
*Desulfotomaculum ruminis* DSM 2154
*Desulfitobacterium hafniense* DCB-2
*Desulfovibrio vulgaris vulgaris* DP4
*Frankia alni* ACN14a
*Frankia* sp. Ccl3
*Geobacter lovleyi* SZ
*Geobacter metallireducens* GS-15
*Geobacter sulfurreducens* PCA
*Geobacter uraniireducens* Rf4
*Gluconacetobacter diazotrophicus* PAl 5
*Halorhodospira halophila* SL1
*Heliobacterium modesticaldum* Ice1
*Herbaspirillum seropedicae* SmR1
*Klebsiella pneumoniae* 342
*Klebsiella variicola* At-22
*Magnetospirillum magneticum* AMB-1
*Mesorhizobium ciceri biovar biserrulae* WSM1271
*Mesorhizobium loti* MAFF303099
*Mesorhizobium opportunistum* WSM2075
*Methanobacterium* sp. AL-21
*Methanococcus aeolicus* Nankai-3
*Methanococcus maripaludis* C5
*Methanosarcina acetivorans* C2A
*Methanosarcina barkeri fusaro*
*Methanosarcina mazei* Go1
*Methanothermobacter thermautotrophicus* Delta H
*Methylobacterium nodulans* ORS 2060
*Methylobacterium* sp. 4-46
*Methylocella silvestris* BL2
*Methylococcus capsulatus* Bath
*Methylomonas methanica* MC09
*Nostoc azollae* 0708
*Nostoc punctiforme* PCC 73102
*Nostoc* sn. PCC 7120
*Pantoea* sp. At-9b
*Pelobacter propionicus* DSM 2379
*Polaromonas naphthalenivorans* CJ2
*Prosthecochloris aestuarii* DSM 271
*Pseudomonas stutzeri* A1501
*Rhizobium etli* CFN 42
*Rhizobium leguminosarum* bv. trifolii WSM1325
*Rhizobium leguminosarum* bv. viciae 3841
*Rhizobium* sp. NGR234 (ANU265)
*Rhodobacter capsulatus* SB1003
*Rhodobacter sphaeroides* ATCC 17029
*Rhodomicrobium vannielii* ATCC 17100
*Rhodopseudomonas palustris* CGA009
*Rhodospirillum centenum* SW
*Rhodospirillum rubrum* ATCC 11170
*Sinorhizobium fredii* NGR234

TABLE 2-continued

Known diazotrophs

Sinorhizobium medicae WSM419
Sinorhizobium meliloti 1021
Synechococcus sp. JA-2-3Ba(2-13)
Teredinibacter turnerae T7901

TABLE 2-continued

Known diazotrophs

Trichodesmium erythraeum IMS101
Xanthobacter autotrophicus Py2

What is claimed is:

1. An engineered diazotroph for increased ammonia production comprising:
    a diazotrophic organism comprising:
        a genome that comprises mutagenesis within a native glutamine synthetase adenylyl transferase gene such that the native glutamine synthetase adenylyl transferase of the diazotrophic organism does not have adenyl removal activity; and
        a transgenic genetic circuit that comprises a unidirectional glutamine synthetase adenylyl transferase gene in operable connection with a promoter, wherein the unidirectional glutamine synthetase adenylyl transferase gene is a sequence derived from a glutamine synthetase adenylyl transferase gene from a genome of a bacterium in which the glutamine synthetase adenylyl transferase gene is modified to have nonfunctional adenylyl removal activity but maintain functional adenylyl transferase activity.

2. The engineered diazotroph of claim 1, wherein the unidirectional glutamine synthetase adenylyl transferase gene is selected from the SEQ ID NOs: 1-7.

3. The engineered diazotroph of claim 2, wherein the unidirectional glutamine synthetase adenylyl transferase gene is selected from SEQ ID NOs: 3-7.

4. The engineered diazotroph of claim 1, wherein the promoter comprises a tetracycline inducing system for controllably inducing expression of the unidirectional glutamine synthetase adenylyl transferase gene.

5. The engineered diazotroph of claim 1, wherein the genetic circuit further comprises a second unidirectional glutamine synthetase adenylyl transferase gene, wherein the second unidirectional glutamine synthetase adenylyl transferase gene is derived from a glutamine synthetase adenylyl transferase gene from a genome of a second bacterium.

6. The engineered diazotroph of claim 1, wherein the unidirectional glutamine synthetase adenylyl transferase gene comprises mutagenesis within the adenylyl removal domain that yields adenylyl removal activity nonfunctional.

7. The engineered diazotroph of claim 6, wherein the mutagenesis within the adenylyl removal domain comprises a truncation, a deletion, or a set of one or more point mutations.

8. The engineered diazotroph of claim 6, wherein the glutamine synthetase adenylyl transferase gene of the bacterium is glnE.

9. The engineered diazotroph of claim 1, wherein the bacterium is *E. coli* or *A. brasilense*.

10. The engineered diazotroph of claim 1, wherein the diazatrophic organism is selected from: *Acetobacterium, Azoarcus, Azorhizobium, Azospirillum, Azotobacter, Bacillus, Bradyrhizobium, Burkholderia, Curtobacterium, Delftia, Duganella, Enterobacter, Frankia, Gluconacetobacter, Halomonas, Herbaspirillum, Klebsiella, Lactobacillus, Mesorhizobium, Methylobacterium, Microbacterium, Mycoplasma, Paenibacillus, Pantoea, Pseudomonas, Rahnella, Rhizobium, Rhodococcus, Rhodopseudomonas, Rhodospirillum, Serratia, Sinorhizobium, Stenotrophomonas, Streptomyces,* and *Xanthobacter.*

11. The engineered diazotroph of claim 10, wherein the diazatrophic organism is selected from: *Azospirillum, Enterobacter, Gluconacetobacter, Herbaspirillum, Klebsiella, Methylobacterium, Paenibacillus, Rahnella,* and *Xanthobacter.*

12. The engineered diazotroph of claim 11, wherein the diazotrophic bacteria is *A. brasilense*.

13. The engineered diazotroph of claim 2, wherein the unidirectional glutamine synthetase adenylyl transferase gene is selected from SEQ ID NOs: 1-2.

14. The engineered diazotroph of claim 3, wherein the unidirectional glutamine synthetase adenylyl transferase gene is SEQ ID NO: 6.

* * * * *

SEQUENCE LISTING

<160> NUMBER OF SEQ ID NOS: 10

<210> SEQ ID NO 1
<211> LENGTH: 1578
<212> TYPE: DNA
<213> ORGANISM: e. coli

<400> SEQUENCE: 1

```
atggcacata tgaccaatgt gcgccgggtg tttaatgaat tgattggcga cgatgaaagt      60
gaaactcagg aagagtcgct gtcggaacag tggcgtgagc tgtggcagga tgcgttgcag     120
gaagatgaca ctacgccagt gctggcgcat cttagcgagg atgatcgcaa acaggtgcta     180
acgctgattg ccgatttccg caaagagctg gataagcgca ccatcgggcc gcgaggacgt     240
caggtgctcg accatctgat gccgcatctg ctaagtgatg tctgtgcgcg tgaagacgct     300
gccgttacgc tgtcgcgcat taccgccttg ctggtgggga ttgttacccg caccacctat     360
ttagaattgc tcagtgaatt ccccgcggcg cttaaacatt tgatttctct gtgtgccgcg     420
tcgccgatga ttgccagcca gctggcgcgt tatccattat tgctggatga attgctcgat     480
ccaaacaccc tttaccagcc gacggcgacc gatgcctacc gcgatgagtt gcgccagtat     540
ttgctgcgcg tgccggaaga tgacgaagag caacagcttg aggcgctgcg tcagttcaaa     600
caggcgcagc tgttacgcat cgccgcagcg gatatcgccg gtacgctacc ggtgatgaaa     660
gtgagcgatc acttaacctg gctggcggaa gccatgatag atgccgtcgt tcagcaggcg     720
tgggttcaaa tggttgcccg ctacggtaag ccgaatcacc tgaacgaacg cgaagggcgt     780
ggttttgcgg tggtcggcta cggcaagctg ggcggctggg agttaggcta cagttccgat     840
cttgacctta tcttcctcca tgattgccca atggatgcga tgactgacgg tgagcgggaa     900
atcgacgggc ggcagttta tctgcgtctg gcgcaacgca ttatgcatct gttcagtacg     960
cgtacctctt ccggcatttt gtatgaagtg gatgctcgac tgcgtccgtc cggggcggcg    1020
ggaatgctgg tgacatccgc agaagcattt gccgattatc agaaaaacga ggcctggacg    1080
tgggaacatc aggcgctggt gcgtgcgcgt gtagtgtacg gcgatccgca gctcaccgcg    1140
cactttgacg cagtgcgtcg cgagattatg acgctgccgc gtgaaggtaa aactctgcaa    1200
acggaagtgc gggaaatgcg cgagaaaatg cgcgctcatc tcggcaataa acatcgcgat    1260
cgctttgata tcaaagctga tgaaggggga attaccgata tcgaatttat tacccaatat    1320
ctggtgttgc gctacgctca tgaaaaaccg aagttaacgc gctggtcaga caacgtgcgt    1380
attctggaac tactggcgca aaacgacatt atggaagagc aggaagcgat ggcgctgacc    1440
cgtgcttaca ctacgcttcg cgatgaactt catcatctgg cattacagga attgccgggc    1500
catgtgtcgg aggattgctt caccgcagag cgtgaactgg tgcgggcaag ctggcagaag    1560
tggctggtgg aagaatga                                                  1578
```

<210> SEQ ID NO 2
<211> LENGTH: 1020
<212> TYPE: DNA

<213> ORGANISM: e. coli

<400> SEQUENCE: 2

```
atggacgaag agcaacagct tgaggcgctg cgtcagttca acaggcgca gctgttacgc      60
atcgccgcag cggatatcgc cggtacgcta ccggtgatga agtgagcga tcacttaacc     120
tggctggcgg aagccatgat agatgccgtc gttcagcagg cgtgggttca aatggttgcc     180
cgctacggta agccgaatca cctgaacgaa cgcgaagggc gtggttttgc ggtggtcggc     240
tacggcaagc tgggcggctg ggagttaggc tacagttccg atcttgacct tatcttcctc     300
catgattgcc aatggatgc gatgactgac ggtgagcggg aaatcgacgg gcggcagttt      360
tatctgcgtc tggcgcaacg cattatgcat ctgttcagta cgcgtacctc ttccggcatt     420
ttgtatgaag tggatgctcg actgcgtccg tccggggcgg cgggaatgct ggtgacatcc     480
gcagaagcat ttgccgatta tcagaaaaac gaggcctgga cgtgggaaca tcaggcgctg     540
gtgcgtgcgc gtgtagtgta cggcgatccg cagctcaccg cgcactttga cgcagtgcgt     600
cgcgagatta tgacgctgcc gcgtgaaggt aaaactctgc aaacggaagt gcgggaaatg     660
cgcgagaaaa tgcgcgctca tctcggcaat aaacatcgcg atcgctttga tatcaaagct     720
gatgaagggg gaattaccga tatcgaattt attacccaat atctggtgtt gcgctacgct     780
catgaaaaac cgaagttaac gcgctggtca gacaacgtgc gtattctgga actactggcg     840
caaaacgaca ttatggaaga gcaggaagcg atggcgctga cccgtgctta cactacgctt     900
cgcgatgaac ttcatcatct ggcattacag gaattgccgg ccatgtgtc ggaggattgc      960
ttcaccgcag agcgtgaact ggtgcgggca agctggcaga agtggctggt ggaagaatga    1020
```

<210> SEQ ID NO 3
<211> LENGTH: 1671
<212> TYPE: DNA
<213> ORGANISM: a. brasilense

<400> SEQUENCE: 3

```
atgctcggcc gggtggagga ccgctacgcc gagctgttcg aggaggcgcc gtcgctgtcc      60
ggccccggca acctcgtctt caccggcacc gacgacgacc ccggcaccgt gaagacgctg     120
gccggcatgg gctaccgcga ccccagccgg gtcatcgccg tggtctccac ctggcaccgc     180
gggcgctacc gctccacccg ctcgggccgc gcgcgggagc tgctgaccga gctggtgccg     240
gccatgctga acgagctggc gaagaccccc gccccggacg acgcgctggt taagttcgac     300
agcttcctgg agcggcttcc ggcggggggtc gggctgttct cgctgttcat cgccaacccc     360
tggctgctcg ccctggtcgc ggagatcatg ggcacggcgc gcagctggc cgagacgttg      420
tcgcgcaacc cgtcgctgct cgacgccgtg ctgtcgcccg acttcttcga cccgctgccc     480
gacgcggcgg ggctgacgcc ggagtaccag cgcttcatcg ccggggcgca caacttcgag     540
gatgtgctga ccctgtcgcg cgcgctggac caacgaccag cgcttccgcg cggggcgcac     600
atcctgcgcg gcatcaccga cggcgaccgc tgcggcccct tcctcgccga tctggccgac     660
gtggtggtgc cggagctggc cgcccgcgtg gaggaggagt cgccgcccg ccacggccgc       720
atccccggcg gcgcctgggt ggtggtggcg atgggcaagc taggcagccg gcagctcacc     780
atcacctccg acatcgacct gatcgtggtc tacgaggtgc cgccgggcac ccgccagtcg     840
gacggagcca agccgctggc ccccaacgag tattacatca agctgacgca gcgcctgacc     900
aacgccatca ccgcccgat ggcgacggg cggctgtacg aggtggacat gcggctgcgc       960
ccgtcgggca acgccggtcc gctcgccacc gcgctggacg ccttcaccgc ctatcaggcc    1020
```

| | |
|---|---|
| aaggatgcct ggacgtggga gcacatggcc ctgacccgcg cccgcgtcat cggcagtgat | 1080 |
| tccggcggcg gcgatccggc gctgggtcat aaggtcgagt cggcgatccg cggtgtgctg | 1140 |
| accggcccgc gcgacccggc caaggtgctg cgggacgtcg ccgacatgcg ccgccgcatc | 1200 |
| gacaaggagt tcggcaccac caacccgtgg aacgtcaaat acgcccgcgg cggcctgatc | 1260 |
| gacatcgagt tcacggccca gtatctccag ctccgtcacg gccacgcgca tccggacatc | 1320 |
| ctgtccatcg ccaccagccg cgccctgctc aacgccgctg cggccgggct gctggcgccg | 1380 |
| gaggtggcgg aggagctggt ggcgacgctg aagctgtggc ggcgggtgca gggcttcctg | 1440 |
| cgcctgacca ccgacggcgt gctcgatccg cggcaggttt cgcccaccct gcgggagggc | 1500 |
| ctctcgcgcg ccgccttccc ggacgaggag ccggcggttg acttcgccgc gctcgacagc | 1560 |
| agaatccggg acatcgccgc ccgcgcccac cgccatttcg tggcgctggt cgaggagccg | 1620 |
| gcgtcaaggc tgcctccccc agagaccaac gaagaagcca aactcccatg a | 1671 |

<210> SEQ ID NO 4
<211> LENGTH: 1143
<212> TYPE: DNA
<213> ORGANISM: a. brasilense

<400> SEQUENCE: 4

| | |
|---|---|
| atgaacttcg aggatgtgct gaccctgtcg cggcgctgga ccaacgacca gcgcttccgc | 60 |
| gccggggcgc acatcctgcg cggcatcacc gacggcgacc gctgcggccc cttcctcgcc | 120 |
| gatctggccg acgtggtggt gccggagctg gccgcccgcg tggaggagga gttcgccgcc | 180 |
| cgccacggcc gcatccccgg cggcgcctgg gtggtggtgg cgatgggcaa gctaggcagc | 240 |
| cggcagctca ccatcacctc cgacatcgac ctgatcgtgg tctacgaggt gccgccgggc | 300 |
| acccgccagt cggacggagc caagccgctg gcccccaacg agtattacat caagctgacg | 360 |
| cagcgcctga ccaacgccat caccgccccg atggccgacg gcggctgta cgaggtggac | 420 |
| atgcggctgc gcccgtcggg caacgccggt ccgctcgcca ccgcgctgga cgccttcacc | 480 |
| gcctatcagg ccaaggatgc ctggacgtgg gagcacatgg ccctgacccg cgcccgcgtc | 540 |
| atcggcagtg attccggcgg cggcgatccg gcgctgggtc ataaggtcga gtcggcgatc | 600 |
| cgcggtgtgc tgaccggccc gcgcgacccg gccaaggtgc tgcgggacgt cgccgacatg | 660 |
| cgccgccgca tcgacaagga gttcggcacc accaacccgt ggaacgtcaa atacgcccgc | 720 |
| ggcggcctga tcgacatcga gttcacggcc cagtatctcc agctccgtca cggccacgcg | 780 |
| catccggaca tcctgtccat cgccaccagc cgcgccctgc tcaacgccgc tgcggccggg | 840 |
| ctgctggcgc cggaggtggc ggaggagctg gtggcgacgc tgaagctgtg gcggcgggtg | 900 |
| cagggcttcc tgcgcctgac caccgacggc gtgctcgatc cgcggcaggt tcgcccaccc | 960 |
| tgcgggaggg cctctcgcgc gccgccttc ccggacgagg agccggcggt tgacttcgcc | 1020 |
| gcgctcgaca gcagaatccg ggacatcgcc gcccgcgccc accgccattt cgtggcgctg | 1080 |
| gtcgaggagc cggcgtcaag gctgcctccc ccagagacca acgaagaagc caaactccca | 1140 |
| tga | 1143 |

<210> SEQ ID NO 5
<211> LENGTH: 1575
<212> TYPE: DNA
<213> ORGANISM: a. brasilense

<400> SEQUENCE: 5

-continued

| | |
|---|---|
| atgcccggca cggtgaagac gctggccggc atgggctacc gcgaccccag ccgggtcatc | 60 |
| gccgtggtct ccacctggca ccgcgggcgc taccgctcca cccgctcggg ccgcgcgcgg | 120 |
| gagctgctga ccgagctggt gccggccatg ctgaacgagc tggcgaagac ccccgccccg | 180 |
| gacgacgcgc tggttaagtt cgacagcttc ctggagcggc ttccggcggg ggtcgggctg | 240 |
| ttctcgctgt tcatcgccaa ccccctggct gctcgccctgg tcgcggagat catgggcacg | 300 |
| gcgccgcagc tggccgagac gttgtcgcgc aacccgtcgc tgctcgacgc cgtgctgtcg | 360 |
| cccgacttct tcgacccgct gcccgacgcg gcggggctga cgccggagta ccagcgcttc | 420 |
| atcgccgggg cgcacaactt cgaggatgtg ctgacccctg tcgcggcgct gaccaacgac | 480 |
| cagcgcttcc gcgccggggc gcacatcctg cgcggcatca ccgacggcga ccgctgcggc | 540 |
| cccttcctcg ccgatctggc cgacgtggtg gtgccggagc tggccgcccg cgtggaggag | 600 |
| gagttcgccg cccgccacgg ccgcatcccc ggcggcgcct gggtggtggt ggcgatgggc | 660 |
| aagctaggca gccggcagct caccatcacc tccgacatcg acctgatcgt ggtctacgag | 720 |
| gtgccgccgg gcacccgcca gtcggacgga gccaagccgc tggcccccaa cgagtattac | 780 |
| atcaagctga cgcagcgcct gaccaacgcc atcaccgccc cgatggccga cgggcggctg | 840 |
| tacgaggtgg acatgcggct gcgcccgtcg ggcaacgccg gtccgctcgc caccgcgctg | 900 |
| gacgccttca ccgcctatca ggccaaggat gcctggacgt gggagcacat ggccctgacc | 960 |
| cgcgcccgcg tcatcggcag tgattccggc ggcggcgatc cggcgctggg tcataaggtc | 1020 |
| gagtcggcga tccgcggtgt gctgaccggc ccgcgcgacc cggccaaggt gctgcgggac | 1080 |
| gtcgccgaca tgccgccgcg catcgacaag gagttcggca ccaccaaccc gtggaacgtc | 1140 |
| aaatacgccc gcggcggcct gatcgacatc gagttcacgg cccagtatct ccagctccgt | 1200 |
| cacggccacg cgcatccgga catcctgtcc atcgccacca ccgcgccct gctcaacgcc | 1260 |
| gctgcggccg ggctgctggc ccggaggtg gcggaggagc tggtggcgac gctgaagctg | 1320 |
| tggcggcggg tgcagggctt cctgcgcctg accaccgacg cgtgctcga tccgcggcag | 1380 |
| gtttcgccca ccctgcggga gggcctctcg cgcgccgcct tcccggacga ggagccggcg | 1440 |
| gttgacttcg ccgcgctcga cagcagaatc cgggacatcg ccgcccgcgc ccaccgccat | 1500 |
| ttcgtggcgc tggtcgagga gccggcgtca aggctgcctc ccccagagac caacgaagaa | 1560 |
| gccaaactcc catga | 1575 |

<210> SEQ ID NO 6
<211> LENGTH: 1500
<212> TYPE: DNA
<213> ORGANISM: a. brasilense

<400> SEQUENCE: 6

| | |
|---|---|
| atgcaccgcg ggcgctaccg ctccacccgc tcggccgcg cgcgggagct gctgaccgag | 60 |
| ctggtgccgg ccatgctgaa cgagctggcg aagaccccg ccccgacga cgcgctggtt | 120 |
| aagttcgaca gcttcctgga gcggcttccg gcggggtcg ggctgttctc gctgttcatc | 180 |
| gccaaccccct ggctgctcgc cctggtcgcg gagatcatgg gcacggcgcc gcagctggcc | 240 |
| gagacgttgt cgcgcaaccc gtcgctgctc gacgccgtg tgtcgcccga cttcttcgac | 300 |
| ccgctgcccg acgcggcggg gctgacgccg gagtaccagc gcttcatcgc cggggcgcac | 360 |
| aacttcgagg atgtgctgac cctgtcgcgg cgctggacca acgaccagcg cttccgcgcc | 420 |
| ggggcgcaca tcctgcgcgg catcaccgac ggcgaccgct cggcccctt cctcgccgat | 480 |
| ctggccgacg tggtggtgcc ggagctggcc gcccgcgtgg aggaggagtt cgccgcccgc | 540 |

| | |
|---|---|
| cacggccgca tccccggcgg cgcctgggtg gtggtggcga tgggcaagct aggcagccgg | 600 |
| cagctcacca tcacctccga catcgacctg atcgtggtct acgaggtgcc gccgggcacc | 660 |
| cgccagtcgg acggagccaa gccgctggcc cccaacgagt attacatcaa gctgacgcag | 720 |
| cgcctgacca acgccatcac cgccccgatg gccgatgggc ggctgtacga ggtggacatg | 780 |
| cggctgcgcc cgtcgggcaa cgccggtccg ctcgccaccg cgctggacgc cttcaccgcc | 840 |
| tatcaggcca aggatgcctg gacgtgggag cacatggccc tgacccgcgc cgcgtcatc | 900 |
| ggcagtgatt ccggcggcgg cgatccggcg ctgggtcata aggtcgagtc ggcgatccgc | 960 |
| ggtgtgctga ccgcccgcg cgacccgcc aaggtgctgc gggacgtcgc cgacatgcgc | 1020 |
| cgccgcatcg acaaggagtt cggcaccacc aacccgtgga cgtcaaata cgcccgcggc | 1080 |
| ggcctgatcg acatcgagtt cacggcccag tatctccagc tccgtcacgg ccacgcgcat | 1140 |
| ccggacatcc tgtccatcgc caccagccgc gccctgctca acgccgctgc ggccgggctg | 1200 |
| ctggcgccgg aggtggcgga ggagctggtg gcgacgctga gctgtggcg gcgggtgcag | 1260 |
| ggcttcctgc gcctgaccac cgacggcgtg ctcgatccgc ggcaggtttc gcccacctg | 1320 |
| cgggagggcc tctcgcgcgc cgccttcccg gacgaggagc cggcggttga cttcgccgcg | 1380 |
| ctcgacagca gaatccggga catcgccgcc cgcgcccacc gccatttcgt ggcgctggtc | 1440 |
| gaggagccgg cgtcaaggct gcctccccca gagaccaacg aagaagccaa actcccatga | 1500 |

<210> SEQ ID NO 7
<211> LENGTH: 1428
<212> TYPE: DNA
<213> ORGANISM: a. brasilense

<400> SEQUENCE: 7

| | |
|---|---|
| atgctgaacg agctggcgaa gacccccgcc ccggacgacg cgctggttaa gttcgacagc | 60 |
| ttcctggagc ggcttccggc gggggtcggg ctgttctcgc tgttcatcgc caacccctgg | 120 |
| ctgctcgccc tggtcgcgga gatcatgggc acggcgccgc agctggccga acgttgtcg | 180 |
| cgcaacccgt cgctgctcga cgccgtgctg tcgcccgact tcttcgaccc gctgcccgac | 240 |
| gcggcggggc tgacgccgga gtaccagcgc ttcatcgccg gggcgcacaa cttcgaggat | 300 |
| gtgctgaccc cgtcgcggcg ctggaccaac gaccagcgct tccgcgccgg ggcgcacatc | 360 |
| ctgcgccgca tcaccgacgg cgaccgctgc ggccccttcc tcgccgatct ggccgacgtg | 420 |
| gtggtgccgg agctggccgc ccgcgtggag gaggagttcg ccgcccgcca cggccgcatc | 480 |
| cccggcggcc cctgggtggt ggtggcgatg gcaagctag gcagccggca gctcaccatc | 540 |
| acctccgaca tcgacctgat cgtggtctac gaggtgccgc cgggcacccg ccagtcggac | 600 |
| ggagccaagc cgctggcccc caacgagtat tacatcaagc tgacgcagcg cctgaccaac | 660 |
| gccatcaccg ccccgatggc cgacgggcgg ctgtacgagg tggacatgcg gctgcgcccg | 720 |
| tcgggcaacg ccggtccgct cgccaccgcg ctggacgcct tcaccgccta tcaggccaag | 780 |
| gatgcctgga cgtgggagca catggccctg acccgcgccc gcgtcatcgg cagtgattcc | 840 |
| ggcggcggcg atccggcgct gggtcataag gtcgagtcgg cgatccgcgg tgtgctgacc | 900 |
| ggcccgcgca accggccaa ggtgctgcgg gacgtcgccg acatgcgccg ccgcatcgac | 960 |
| aaggagttcg gcaccaccaa cccgtggaac gtcaaatacg cccgcggcgg cctgatcgac | 1020 |
| atcgagttca cggcccagta tctccagctc cgtcacggcc acgcgcatcc ggacatcctg | 1080 |
| tccatcgcca ccagccgcgc cctgctcaac gccgctgcgg ccgggctgct ggcgccggag | 1140 |

```
gtggcggagg agctggtggc gacgctgaag ctgtggcggc gggtgcaggg cttcctgcgc    1200
ctgaccaccg acggcgtgct cgatccgcgg caggtttcgc ccaccctgcg ggagggcctc    1260
tcgcgcgccg ccttcccgga cgaggagccg gcggttgact tcgccgcgct cgacagcaga    1320
atccgggaca tcgccgcccg cgcccaccgc catttcgtgg cgctggtcga ggagccggcg    1380
tcaaggctgc ctcccccaga gaccaacgaa gaagccaaac tcccatga                 1428

<210> SEQ ID NO 8
<211> LENGTH: 1578
<212> TYPE: DNA
<213> ORGANISM: artificial
<220> FEATURE:
<223> OTHER INFORMATION: Codon-modified AT-C from E. coli

<400> SEQUENCE: 8
atggcgcaca tgacgaacgt caggagagtc ttcaacgagc tcatcgggga tgacgagtcg      60
gagacgcaag aggaaagctt aagcgagcaa tggagggaat tatggcaaga cgcactccaa     120
gaggacgata ccaccccgt cttagcccac ttgtcggaag acgacaggaa gcaagttttg      180
accttaatcg cggactttag gaaggaatta gacaaaagga cgattggccc caggggcagg     240
caagtcttgg atcacttaat gccccactta ttgtccgacg tgtgcgccag ggaggatgcc     300
gcagtgacct taagcagaat cacggcgctc ttagtcggca tcgtcacgag gacgacgtac     360
ctggagctct tgtcggagtt tccggccgcc ttgaagcacc tcatcagctt atgcgcggcc     420
agccccatga tcgcgtcgca attagccaga taccgctgc ttttagacga gctcttggac      480
ccgaatacgt tgtatcaacc caccgccaca gacgcgtata gggacgaact cagacaatac     540
cttttaagag tccccgagga cgatgaggaa cagcaattgg aagccttaag gcaatttaag     600
caagcccaat tactgagaat tgcagccgca gacattgcgg gcaccttgcc cgttatgaag     660
gtttcggacc atctgacgtg gttagccgag gcgatgatcg acgcggtggt ccaacaagcc     720
tgggtccaga tggtcgcgag gtatggcaaa ccaaaccatt taaatgagag agagggcaga     780
ggcttcgcag tcgtgggata tgggaaatta gggggggtggg aactggggta ttccagtgac     840
ttggatttga tattttttgca cgactgtccc atggacgcca tgacggatgg cgaaagagag     900
attgatggaa gacaattcta cttaaggtta gcccagagga tcatgcactt attttccacc     960
aggacgagca gtgggatcct ctacgaggtc gacgccaggt taagacctag tggcgccgcc    1020
ggcatgttag tcaccagtgc tgaggcgttc gcggactacc aaaagaatga agcatggacc    1080
tgggagcacc aagccttagt tagggccagg gtggtctatg gagacccca attgacggcc     1140 catttcgatg cggtcagaag ggaaatcatg accttaccca gggagggcaa gaccttacag    1200
accgaggtca gagagatgag agaaaagatg agggcccact tggggaacaa gcacagagac    1260
aggttcgaca taaaggcgga cgagggcggc atcacggaca ttgagttcat cactcagtac    1320
ttagtcctca gatatgccca cgagaagccc aaactgacca gatggagtga taatgtcaga    1380
atcttagagt tgttagctca gaatgatatc atggaggaac aagaggccat ggccttaacg    1440
agggcctata cgaccttgag ggacgagttg caccacttag cgctgcaaga gctccccggg    1500
cacgtcagcg aagactgttt tacgccgaa agagagttag ttagagcgtc ttggcaaaaa    1560
tggttagtcg aggagtga                                                 1578

<210> SEQ ID NO 9
<211> LENGTH: 1029
<212> TYPE: DNA
<213> ORGANISM: p1 bacteriophage
```

```
<400> SEQUENCE: 9
gtgaatttac tgaccgtaca ccaaaatttg cctgcattgc cggtcgatgc aacgagtgat        60
gaggttcgca agaacctgat ggacatgttc agggatcgcc aggcgttttc tgagcatacc       120
tggaaaatgc ttctgtccgt ttgccggtcg tgggcggcat ggtgcaagtt gaataaccgg       180
aaatggtttc ccgcagaacc tgaagatgtt cgcgattatc ttctatatct tcaggcgcgc       240
ggtctggcag taaaaactat ccagcaacat ttgggccagc taaacatgct tcatcgtcgg       300
tccgggctgc cacgaccaag tgacagcaat gctgtttcac tggttatgcg gcgtatccga       360
aaagaaaacg ttgatgccgg tgaacgtgca aaacaggctc tagcgttcga acgcactgat       420
ttcgaccagg ttcgttcact catggaaaat agcgatcgct gccaggatat acgtaatctg       480
gcatttctgg ggattgctta taacaccctg ttacgtatag ccgaaattgc caggatcagg       540
gttaaagata tctcacgtac tgacggtggg agaatgttaa tccatattgg cagaacgaaa       600
acgctggtta gcaccgcagg tgtagagaag gcacttagcc tgggggtaac taaactggtc       660
gagcgatgga tttccgtctc tggtgtagct gatgatccga ataactacct gttttgccgg       720
gtcagaaaaa atggtgttgc cgcgccatct gccaccagcc agctatcaac tcgcgccctg       780
gaagggattt ttgaagcaac tcatcgattg atttacggcg ctaaggatga ctctggtcag       840
agatacctgg cctggtctgg acacagtgcc cgtgtcggag ccgcgcgaga tatggcccgc       900
gctggagttt caataccgga gatcatgcaa gctggtggct ggaccaatgt aaatattgtc       960
atgaactata tccgtaacct ggatagtgaa acagggcaa tggtgcgcct gctggaagat      1020
ggcgactaa                                                             1029

<210> SEQ ID NO 10
<211> LENGTH: 34
<212> TYPE: DNA
<213> ORGANISM: artificial
<220> FEATURE:
<223> OTHER INFORMATION: loxp site

<400> SEQUENCE: 10
ataacttcgt ataatgtatg ctatacgaag ttat                                    34
```